United States Patent [19]

Haagens et al.

[11] Patent Number: 4,908,823
[45] Date of Patent: Mar. 13, 1990

[54] HYBRID COMMUNICATIONS LINK ADAPTER INCORPORATING INPUT/OUTPUT AND DATA COMMUNICATIONS TECHNOLOGY

[75] Inventors: Randolph B. Haagens, Roseville; Thomas A. Keaveny, Rocklin, both of Calif.

[73] Assignee: Hewlett-Packard Company, Palo Alto, Calif.

[21] Appl. No.: 150,262

[22] Filed: Jan. 29, 1988

[51] Int. Cl.$^4$ .......................................... H04Q 11/04
[52] U.S. Cl. ........................... 370/85.1; 455/606; 340/825.5; 340/825.2; 340/825.03; 370/91; 375/8
[58] Field of Search ............. 340/825.03, 825.2, 825.5, 340/825.52, 825.53; 364/200 MS File, 900 MS File; 455/601, 605, 606, 607; 370/85, 91, 93, 92, 94, 60, 84, 112; 375/8, 9, 117, 121

[56] References Cited

U.S. PATENT DOCUMENTS

| | | | |
|---|---|---|---|
| 3,937,882 | 2/1976 | Bingham | 375/8 |
| 4,677,614 | 6/1987 | Circo | 370/86 |
| 4,715,045 | 12/1987 | Lewis et al. | 370/82 |
| 4,730,308 | 3/1988 | Friedman et al. | 370/94 |
| 4,734,908 | 3/1988 | Hedlund | 370/94 |
| 4,748,656 | 5/1988 | Gibbs et al. | 364/900 |
| 4,761,735 | 8/1988 | Amy | 364/200 |

Primary Examiner—Donald J. Yusko
Assistant Examiner—E. O. Pudpud

[57] ABSTRACT

There is disclosed a data communications link adapter providing flow of data control and status information between an input/output (I/O) Backplane and a fiber optic Frontplane. The adapter represents a melding of I/O channel extender technology and data communications technology: a dedicated processor handles link layer protocol, leaving to software only higher protocol layers; a flow-through architecture is provided by the adapter; a combination of windowing and handshaking are used; and a relatively short frame of sixteen bytes is employed. The adapter includes a backplane adapter portion which serves to interconnect host equipment, a processor portion dedicated to layer 3 (circuit operations), a protocol controller dedicated to layer 2 (physical layer) operations, a fiber optic interface portion dedicated to layer 1 (physical link) operations, and an arbiter portion which couples the processor to a data path connecting the backplane adapter and the protocol controller. The arbiter controls data accesses that use a portion of the data path connecting the backplane adapter to the protocol controller and a data path between the protocol controller and the processor. A variety of data integrity measures are implemented on all data paths. The adapter facilitates data flow-through by buffering internal to the protocol controller, and has extensive data flow control features.

17 Claims, 12 Drawing Sheets

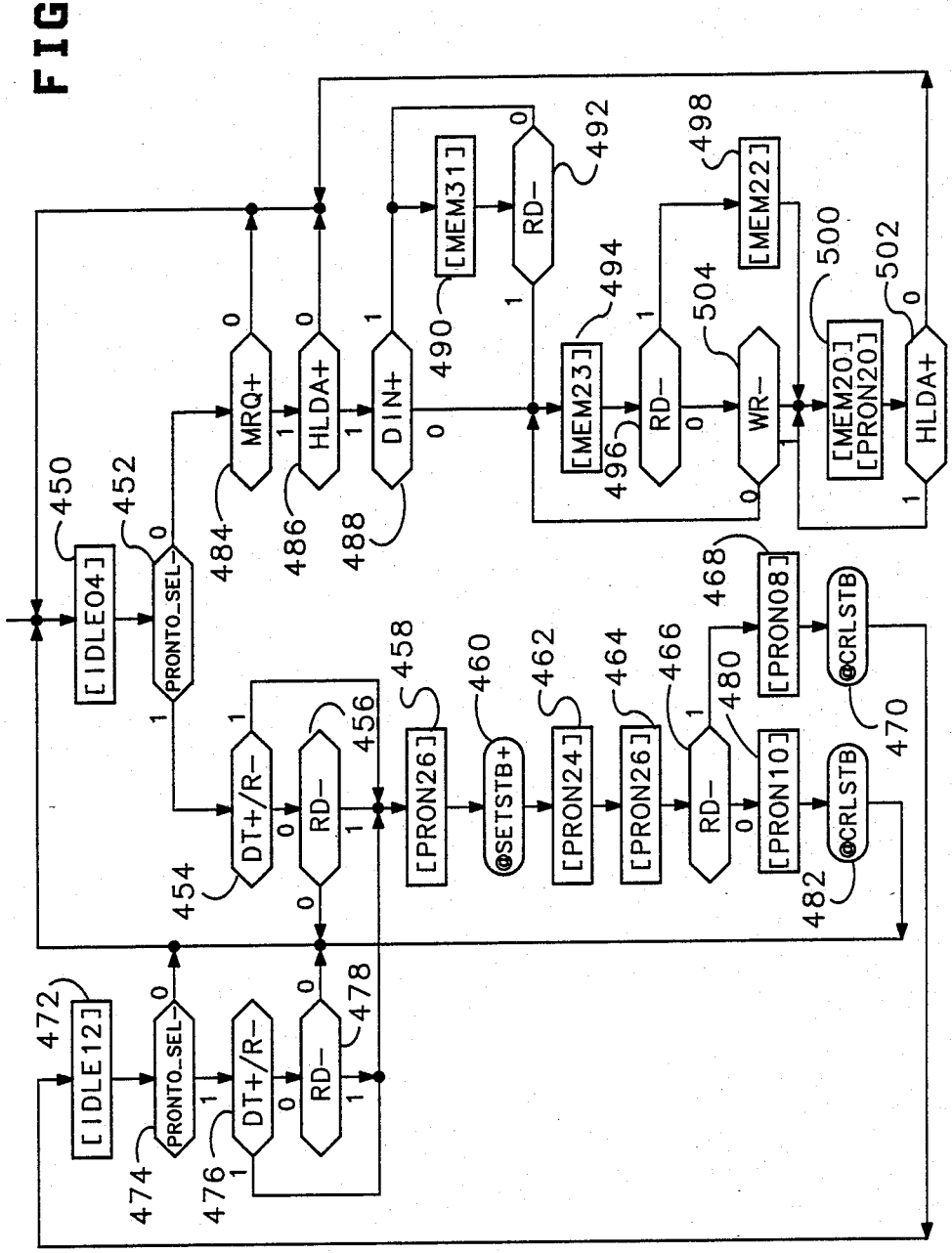

HYBRID COMMUNICATIONS LINK ADAPTER INCORPORATING INPUT/OUTPUT AND DATA COMMUNICATIONS TECHNOLOGY

CROSS REFERENCE TO RELATED, CO-PENDING APPLICATIONS

Related, co-pending applications of particular interest to the instant application are U.S. patent application Ser. No. 07/319,897, filed Mar. 3, 1989 on behalf of Dolkes et al., entitled "Link Layer Protocol and Apparatus for Data Communications" and U.S. patent application Ser. No. 07/235,746, filed on behalf of Shankar et al., now U.S. Pat. No. 4,873,703, entitled "A SYNCHRONIZING SYSTEM" both commonly assigned with the instant application.

FIELD OF THE INVENTION

The invention relates to data links between electronic equipment separated in physical location and, more particularly, to a link which provides several time-division multiplexed logical, or virtual, serial data paths between such equipment connected by a single physical duplex communications link.

BACKGROUND OF THE INVENTION

Communication of data between electronic equipment which is separated in physical location is a commmon requirement. In one illustrative application, peripheral equipments are to be attached to a host computer via the adaptor of the instant invention. For short distances, so-called input/output (I/O) channels have been employed for such communication. I/O channels are characteristically fast, and employ many hard-wired conductors and consquently are expensive per foot of distance. Accordingly, they are restricted to short distanced. I/O channels typically utilize simple, fully-interlocked, handshaking protocols to provide control of data flow over the link.

Because of their relatively unsophisticated flow control, many wire conductors are needed to support the handshaking needed to effect the link. For instance, sixteen wires in an Interface Bus manufactured by Hewlett-Packard Co., twenty-two in a communications link described in U.S. Pat. No. 4,276,656 to E. M. Petryck, Jr., and approximately fifty in a MASSBUS manufactured by Digital Equipment Co. Primitive error control is provided by unsophisticated parity checking, for example.

In addition to the problems associated with numerous conductors, four other difficulties are encountered in the use of I/O channels: first, signal integrity is compromised by the degraded signal carried by multiple-conductor buses. The length of the lines accounts for some of this degradation because external noise is induced. Secondly, internal, or cross-coupled energy, induces noise into signals carried on adjacent conducting lines. Thirdly, the parallel trransmission of data produces a timing skew in the signals at the far end of the link. That is, signals may arrive at the receiver in a different order from that in which they were transmitted. Accordingly, a "worst-case" speed penalty is extracted by the need to await complete reception of all signals so that they may be processed by the receive in their proper order. Fourthly, an interactive delay restricting the maximum data rate is imposed by the use of I/O channels, by the propagation delay required to travel the physical distance. For instance, in a four-edge protocol, if a 2.5 microsecond propagation delay is imposed by the physical distance, then 4×2.5 or 10 microseconds are needed to conclude parallel transmission of one word on a channel in a four-edge protocol.

In an effort to solve some of the problems associated with I/O channels, so-called channel extenders are known. Instead of many parallel data paths, a signal time-division multiplexed (TDM) serial physical link is employed in conjunction with the channel extenders. The Petryck patent discloses the use of such a system employing a fiber optic physical link. This approach solves the signal integrity problem described above because a single fiber-optic media does not pick up external or internal noise.

However, a new complexity is introduced by the use of channel extenders: namely the need for sampling TDM data transmitted over the single physical link. The Hewlett-Packard Interface Bus designated 37203A or 37203B samples at regular intervals; the system taught by Petryck samples only upon detection of changes in the data pattern to be transmitted. However, in any case problems remain with the use of channel extenders because of the need to physically transmit data in parallel over the (shorter) distance between the "host" electronic equipment and the channel extender which it uses. Furthermore, introduction of a channel extender adds another pair of elements into the data link.

A second approach to implementing a data link between electronic equipment is through so-called data communications technology. Characteristic of this technology is the use of fewer wires than for an I/O channel, thus the ability to economically interconnect over longer distances. Such systems require relatively sophisticated data flow and error control involving highly structured data formats. Typically data is serially communicated in "frames" having various "layers" or levels governed by protocols. Representative of data communication systems are wide-area networks defined by X.25 and HDLC. The latter employing a flow control method called "windowing" which pipelines the serial data communicated over the link. A second type of system is known as local area network (LAN) such as "Ethernet" defined by the IEEE 802.3 standard.

Because the electronic equipment connected to a network using data communication technology must itself transmit and receive data over the system, relatively low transmission rates are realized. For instance, sophisticated error control such as cyclic redundancy checking (CRC) is employed which takes a significant amount of processing by the host. HDLC, for example, provides very clumsy flow control employing, as it does, an address header portion of the frame.

Relatively large blocks of data can be transmitted by data communications technology; each frame including a data block of typically several thousand bits of data. Further benefits of the data communication approach are: first, strictly serial transmission avoids skewing of data, second it is particularly amenable to a fiber optic link because only one physical link is required, and because of the use of highly-structured data packages, sophisticated flow and error control is possible.

As mentioned, however, data communications technology is slow because a dedicated microprocessor is needed to process the data into frames and handle the protocols of the various layers. Furthermore, because data is transmitted in large blocks, a memory external to the microprocessor is needed for temporary storage while the frame with which it is transmitted is composed or processed. Use of such external memories slows the "throughput" of data over the system.

Moreover, because of the use of a general-purpose microprocessor to implement the data communications functions, i.e., algorithms, software programs are executed by the microprocessor which extracts a severe time penalty. Virtually no hardware is dedicated to the data communications function, whereas in I/O channel technology, dedicated hardware is used exclusively allowing simplified and faster transmission.

SUMMARY OF THE INVENTION

A hydrid data communications link is provided by the instant invention having the speed and relative simplicity of an I/O channel extender and the sophisticated data flow control and error control of data communications technology. A dedicated programmed logic array (PLA)-based processor handles the link layer protocol leaving to software only the higher protocol layers. Moreover, eight sixteen-byte buffers replace memory, in each of the receive—and transmit—sides, so that a flow-through architecture is provided which improves speed. A combination of windowing and handshaking is supported by the hybrid data link of the instant invention. A relatively short frame sixteen bytes long is employed by the hybrid data link; representing a melding of I/O channel technology which uses frames of 1 byte and data communications technology which uses frames of approximately 1,000 bytes.

The architecture employed by the hybrid link of the instant invention provides ready flow of data between an input/output (I/O) Backplane and a fiber optic Frontplane. A backplane adapter portion serves as the point of interconnection of the host equipment at one end of the link. Data, control and status information is communicated over the backplane adapter. The backplane adapter can establish a logical channel between the host and the physical duplex fiber optic link. Also, various direct memory access (DMA) operations between the I/O Backplane, a processor block within the hybrid link of the instant invention, and a protocol controller block of the hybrid link.

The hybrid link of the present invention removes from the host equipment the complex and time-consuming details of establishing and maintaining communication to the equipment at the other end of the link. Although the link comprises only one physical duplex link, the hybrid link provides time-multiplexed logical channels which are logical replications of the physical link so that they appear to the host as individual physical connections.

The protocol controller portion couples the backplane adapter portion and an interface to the fiber optical physical link. The protocol controller is a dedicated hardware portion of the hybrid link which is responsible for transforming data to and from a Layer 2 protocol format.

A control port of the protocol controller allows the processor block access to control registers within the protocol controller block and for data transfer between the processor block and the link. The registers control and monitor behavior of the link and data transfers thereof. Error conditions and recovery measures are effected over the control port.

A device port of the protocol controller provides access to the backplane adapter. This port is a high speed direct access port which accounts for the majority of data transfers on the link established by the hybrid link. The protocol controller includes a switch which can route data to be transmitted over the link or has been received over the link to either the backplane adapter, via the device port, or the processor, via the control port.

The protocol controller portion also includes a transmit port and a receive port which generate and receive data for the fiber optic interface, respectively.

The fiber optic interface portion of the hybrid link provides parallel-to-serial and serial-to-parallel conversion of data to be transmitted, and data received, over the fiber optic link respectively. The fiber optic interface also includes an optical transmitter and an optical receiver transducers for conversion between digital electrical and analog optical signals which involve Layer 1 (link) operations.

The processor block portion of the hybrid link of the present invention is dedicated to protocol Layer 3 (circuit) operations. Its main responsibility is to process channel requests received via the backplane adapter and to generate therefrom control signals to the protocol controller block which implements the requests. The processor manages the resources of the hybrid link of the present invention and maintains error, status and controls operation of the link. A memory, integral with the processor block, is used by the processor to temporarily store channel requests, data messages, task lists and information about states of circuits within the hybrid link.

A final element of the hybrid link of the instant invention is an arbiter block. The arbiter block couples the processor block to the data path connecting the backplane adapter and the protocol controller. The arbiter then controls data accesses that must use a portion of both the data path between the backplane adapter and the protocol controller and the data path between the protocol controller and the processor. It allows either the backplane adapter or the processor block to be the master of both data paths. The arbiter allows data transfers between the processor block and the protocol controller control port and data transfers between the backplane and the memory integral with the processor block.

BRIEF DESCRIPTION OF THE DRAWINGS

FIGS. 7, 8 and 9 are state-transition diagrams describing the operation of Arbiter 38.

DETAILED DESCRIPTION OF A PREFERRED EMBODIMENT

Figure 1:
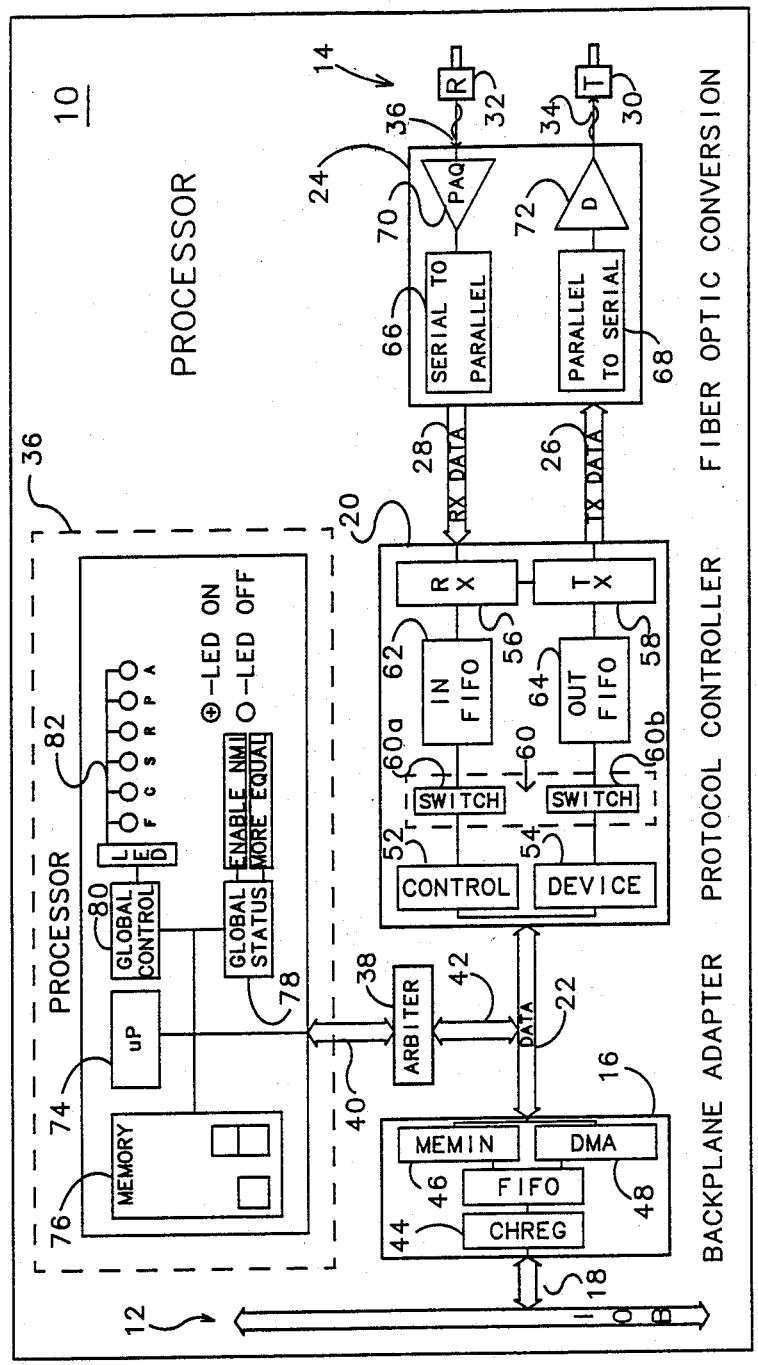
FIG. 1 illustrates the architecture of the hybrid data communications link adaptor 10 of the instant invention.

The hybrid data communications link adapter 10 of the instant invention is illustrated in functional block diagrammatic form in FIG. 1. The link adapter 10 includes an input/output (I/O) "backplane" interface 12 and a "frontplane" interface 14. The backplane 12 allows cnnection of host data terminal equipment (DTE) to the link and the frontplane 14 provides a full-duplex fiber optical link to a remote DTE. The remote DTE may be as far as 500 meters from the host in an exemplary application.

The hybrid communications link adapter element 10 can process a large number of requests, such as 64, from the host as well as requests from the remote DTE. The link adapter element 10 may serve as either a master or a slave to the remote DTE.

Transmission of signals from link adapter element 10 to the remote DTE is controlled by hierarchical levels of protocol. Specific portions of the link adapter shown in FIG. 1 handle different layers of the protocol, as will be described hereinafter. This assures a high level of performance and alleviates this aspect of transmission and reception of data from the host DTE. The adaptor element 10 responds to protocols directed at I/O backplane 12 operations and produces protocol suitable for transmission at the frontplane 14, conversely the link adapter 10 responds to frontplane protocols and generates protocols suitable for the backplane.

As illustrated in FIG. 1, a backplane adapter 16 is connected to the I/O Backplane 12 via a bi-directional bus 18. Backplane adapter 16 is connected to a protocol controller 20 via a bi-directional bus 22. Protocol controller 20 is connected to a fiber optic conversion block 24 by a pair of unidirectional busses 26 and 28. An optical transmitter 30 and an optical receiver 32 comprise the frontplane 14 and are connected to fiber optic conversion block 24 by signal lines 34 and 36, respectively. A processor block 36 is connected to the backplane adapter 16 and protocol controller 20 via an arbiter 38. Arbiter 38 is connected to processor 36 via a bi-directional bus 40 and arbiter 38 is connected to bus 22 via a bi-directional bus 42.

The elements of link adapter 10 shown in FIG. 1, other than the I/O backplane 12, are, in a preferred embodiment, contained on a printed circuit "card", and, accordingly, adapter 10 will be referred to as card 10 occasionally herein.

While a detailed description of the various blocks in FIG. 1 will be given hereinafter in connection with detailed figures, a brief overview of these blocks will now be presented. The backplane adapter 16 serves as the adapter 10 interface to the I/O backplane 12 and is the mechanism by which data, control and status information is passed to and from the card 10 across the backplane. As is understood by those skilled in the art, to the backplane, the backplane adapter 16 appears as a number of addressable registers (channel registers 44) that are selectable through the backplane's addressing mechanism. To increase data throughout, a DMA type "bursting" feature is provided for data transfers to allow the backplane to source or to sink successive elements of data once a channel register within backplane adapter 16 has been selected.

Backplane adapter 16 appears as a memory list-based control device and a high speed direct memory access (DMA) machine. As a memory list-based control device, the backplane adapter 16 appears to processor block 36 as a peripheral that acts upon lists of tasks that are stored in various locations in memory. The backplane adapter 16 is also capable of interrupting the Processor block 36 when certain conditions are detected.

The Backplane Adapter block 16 communicates to the Processor block 36 via a memory in (MEMIN) 46 block to a memory located within the Processor block. Status, data and control information is stored in memory. The Backplane Adapter block 16 interrogates this information to determine, for example, which subchannel interactions must be passed on to the Processor block, and which to process automatically. It also determines the source and destination for data transactions it is instructed to perform.

DMA operations are used by the Backplane adapter 16 to transfer data between any of three paths: backplane 12 to protocol controller 20, backplane 12 to processor 36, and protocol controller 20 to processor 36. The source and destination of these paths are determined by examining the lists stored in memory. A direct memory access (DMA) portion 48 of backplane adapter 16 is employed for DMA operations. An internal half-duplex first-in, first-out (FIFO) 50 within backplane adapter 16 is used to buffer data and pace these data transfers.

The Protocol Control 20 section of the link adapter card 10 is responsible for transforming data to and from the link adapter Layer 2 Protocol format, dependent upon direction of data flow. Protocol control 20 consists of a bi-directional half duplex and a full duplex interface which form four ports: Control 52, Device 54, Receive 56 and Transmit 58. Control 52 and Device 54 ports connect the protocol controller 20 to the bi-directional bus 22 and Receive (Rx) 56 and Transmit (Tx) 58 Ports connect protocol controller 20 to the unidirectional buses 28 and 26, respectively. A special function, known as a "switch" 60 manages the half duplex interface which is shared by the Control and Device port. Outbound data passes from either the Control or Device port to the Transmit port, where it is formatted. Inbound data, from the Receive port, is stripped of Layer 2 formatting and passes to the Control or Device port. Inbound and outbound data paths contain an IN FIFO 62, and an OUT FIFO 64, respectively.

Protocol control takes place in the management of data that is sent and received by the Transmit and Receive ports. In the case of data in the Outbound FIFO 64, the Protocol Control block guarantees that any data loaded into the Outbound FIFO will not be overwritten until it has been correctly received by the remote DTE, and furthermore, that a corresponding Inbound FIFO of a link adapter 10 used by the remote DTE will not be overrun.

For inbound data, the Protocol Control 20 block guarantees that all data has been received in the order it was loaded into the remote's Outbound FIFO, and prevents overrun.

The Control port 52 is used by the Processor block 36 to access registers internal to the Protocol Control block and to transfer data to and from the link adapter 10. These registers are used to control and monitor the behavior of the link adapter and data transfers active on it. Error conditions and recovery measures are managed through this path.

Data transfers via the Control port usually cnsist of Header Messages which follow the Circuit Layer (3) protocol. These Headers are used to setup and execute data transfers between the local link adapter and the remote device. The Device port 54 is a high speed direct access port that handles the majority of I/O traffic on the link. It provides a direct data path to the Inbound or Outbound Internal FIFOs 62 and 64 depending upon the direction of data transfer.

Status indicators are provided to the Backplane Adapter block 16 to indicate whether the device port is ready to send or receive data as well as means of identifying when a particular stream of data has reached a termination condition.

The Switch 60 is a special feature of the Protocol Control block that allows the Inbound and Outbound data paths to be either manually or automatically pointed to the Device port (Backplane Adapter) or Control port (Processor). Each FIFO (Inbound and Outbound) has its own independent switch 60a and 60b, respectively. When the Switch is operated manually, the Processor 36 explicity establishes the connection to the I/O data paths by pointing the switch to one of the ports. In automatic mode, each switch toggles between Control and Device port depending upon information previously loaded into the Control port registers by the Processor. The Switch only affects data transfer paths; it does not inhibit Control port register accesses.

The Transmit port 48 is used by the Protocol control block to send data from the Outbound FIFO 64 to the Fiber Optic Conversion block 24. It also supplies state information to the remote node to allow management of the link adapter (Layer 2 Protocol). Data and state information is packaged in units known as Control and Information Frames. Control Frames contain the current state of the Inbound FIFO 62 as well as link adapter control commands. The integrity of Control Frames are protected by cyclic redundancy check (CRC) codes. Information frames consist of formatted buffers obtained from the Outbound FIFO 64. Formatting calls for prefacing the buffer of data with an Information Header which identifies the particular buffer to be sent, and then appending a cyclic redundancy check (CRC) to the buffer to protect the data buffer's contents.

Two main factors influence whether the Protocol Control block 20 will send an Information Frame out the Transmit port: the ability of the remote device to accept another buffer and the presence of a buffer to be sent. The Protocol Control block can determine the state of the remote DTE Inbound FIFO from data received through the Receive port 56. Control Frames are sent if the block is incapable of sending an Information Frame.

Acknowledgement of outstanding frames, and transmission retry is also caused by examination of the state of the remote Inbound FIFO.

The Receive Port 20 receives in parallel data from the Fiber Optic Conversion block 24, processes it, verifies its integrity, and then extracts the essential link adapter Protocol Layer 2 information from it. Valid data extracted from Information Frames is loaded into the Inbound FIFO 62. Remote device state information is extracted from Information and Control Frames and directs behavior of the Transmit port as described previously. The Receive port also monitors that state of a receiver portion of Fiber Optic Conversion block and provides this information to the Processor block via the control port.

The Fiber Optic Conversion block 24 provides the conversion between parallel and serial data streams. The block includes a serial-to-parallel converter 66 and parallel-to-serial converter 68 that link adapter the optic transmitter 30 and receiver 32 to the Protocol Control block Receive 56 and Transmit 58 ports, respectively.

The optical receiver 32 converts flux on the input fiber into an analog waveform proportional to the intensity of the incoming flux.

The analog signal from the Optical Receiver 32 is conditioned before information may be extracted from it. A Post Amplifier and Quantizer (PAQ) block 70 amplifies the low-level analog signal and quantizes it to boolean logical levels. The quantized signal is conducted to the Serial-to-Parallel Conversion block 66.

The Serial-to-parallel conversion block 66 locks onto the incoming serial waveform and decodes and extracts the original physical layer 1 synchronization, control and data information, reconstructing it into a parallel format which is then sent to the Protocol Control block 20 via bus 28.

Illegal line codes are flagged when the pattern is transferred to the Protocol Control block 20. The presence of activity on the fiber, and the ability to lock onto the serial data stream, are monitored by the Protocol Control block.

Parallel-to-serial conversion block 68 receives parallel data from the protocol Control block; encodes it, and then serializes the data to prepare it for transmission on the optical fiber. The encoding operation is required to accommodate the fact that the link adapter cannot tolerate other than zero direct current voltage (i.e. balanced level) provides a measure of redundancy. A Driver (D) 72 receives the serialized output from the Parallel-to-Serial Converter 68 and conditions it to meet the input requirements of the Optical Transmitter 30 and the power requirements of the attached fiber. The Optical Transmitter 30 receives the signals generated by the Driver 72 and transforms them into optical flux energy which then may drive the outbound optic fiber.

The Processor block 36 receives host processor requests over the I/O Backplane 12 and generates therefrom link adapter protocol circuit layer format; it is a dedicated link adapter Protocol Layer 3 processor. These requests are processed in conjunction with the Backplane Adapter 16. The processor block 36 initiates and processes requests to the remote link adapter that involve the transfer of data through the Protocol Control block 20. Once the Protocol block 36 has determined that a requested transfer may begin it generates signals to the Backplane Adapter 16 and Protocol Control block 20 and continues its own processing independently. The Processor block also responds to requests from remote link adapter that appear at the Protocol Control block 20 and maintains error, status and control operation of the link.

The processor 36 transforms a Channel read or write request into the series of steps necessary to communicate to the remote link. Basically, this involves obtaining one of the link's resources and then sending the necessary commands across this resource in order to transfer data. Where the Channel views the link adapter card 10 as mutiple I/O devices using Logchannels, link adapter 10 uses the concept of Virtual Circuits in multiplexing front-plane resources. All data that is transferred on the link adapter must be preceded by this Virtual Circuit identifier in what is known as a Layer 3 Header. Information within this Header also indicates what use is intended for the Virtual Circuit resource.

A microprocessor 74 portion of Processor block 36 has access to the Control port 52 of protocol control 20, the Backplane Adapter 16 through a Memory 76, and Configuration and Status registers which control and indicate the link adapters current state and mode of operation. Firmware, described later, is executed by the microprocessor 76. Translation of Channel request to peripheral commands is done by the microprocessor and requests originating from the remote link adapter are processed by the microprocessor. The microprocessor is also responsible for performing the on-card diagnostics and monitoring link adapter behavior characteristics.

Memory 76 is the medium of communications between the processor block 36 and the Backplane Adapter 16. Certain types of Channel requests and channel data messages are passed on to the processor block through the Backplane Adapter into memory 76. The Processor 36 responds by building lists of tasks for the Backplane Adapter to process. These lists allow the processor to control the flow of data from the Channel to the DMA interface of the Backplane Adapter 16.

Memory 76 is also used to maintain the state of outstanding Virtual Circuits. As each stage of the link adapter Protocol or phase of a transaction is completed, the state of the Virtual Circuit executing that processor is updated in memory 76.

A Global Status and Global Control LED's block is used by link adapter to obtain information regarding card configuration, hardware revision codes, to display link adapter status through LED's 82 and to provide control over modes of operation. During normal operation, the LED's provide a quick indication of link adapter activity(a), signal quality(s), remote status(r), and proper configuration(c). The LED's come in one of two colors, green indicating normal activity, red indicating and error condition.

The Arbiter block 38 isolates the processor block's data path 40 from the linkl adapter data communication's path between the Backplane Adapter and the Protocol Controller. The Arbiter controls data accesses that must span both busses, allowing either the Backplane Adapter 16 or the Processor 36 to be effective master of both busses.

All I/O operations between the microprocessor 74 and the control port 52 must be initiated through the arbiter 38. During these operations the Backplane Adapter 16 is prevented from accessing either the Protocol Controller 20 or Processor Memory 74.

Backplane Adapter 16 access to Processor Memory 76 is initiated through the arbiter 38. During these operations the microprocessor 74 may only execute internally-queued instructions (if any are present).

Figure 2:
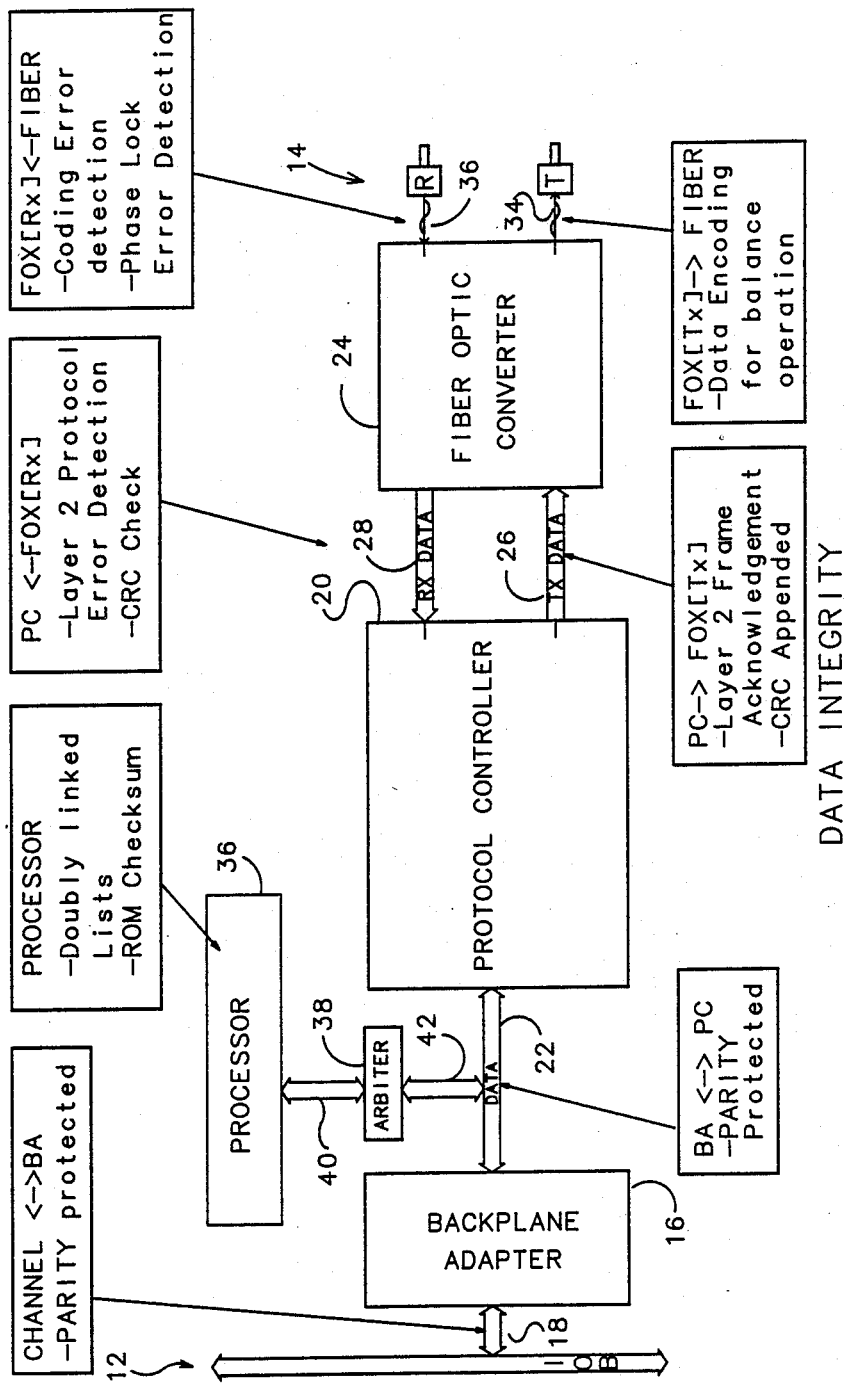
FIG. 2 illustrates the data integrity measures employed on the data link adapter 10 of the instant invention.

With reference to FIG. 2, the data integrity measures employed by the hybrid data communications link adapter 10 of the present invention will now be described. Data on bi-directional bus 18 and bi-directional bus 22 is partly protected. One parity bit is assigned to each byte transmitted in parallel on bus 18.

Data communicated between protocol controller 20 and fiber optic converter 24 is protected in several ways: In the outbound direction, a cyclic redundancy check (CRC) portion is appended to each frame carried on bus 26 by protocol controller 20. In the inbound direction, validity of a CRC portion received on bus 28 is verified by protocol controller 20 and a special sequence of control codes generated by fiber optic converter 24 must be detected by protocol controller 20.

Protocol controller 20 also monitors status lines (not shown) originating at the fiber-optic converter 24 and rejects frames occasioned by faulty status indications.

The transmit side of fiber optic conversion block 24 employs an encoding scheme which maintains balanced levels on the optical link adapter for outbound signal streams on signal line 34. The optical receiver portion of optic conversion block 24 detects illegal codes in the incoming bit stream and reports inability to lock onto the stream on signal line 36.

The processor block 36 employs a CRC method to verify data stored in a read-only portion memory 76 and doubly-linked lists when accessing data therein. Thus, link adapter 10 employs the following error control hierarchy:

(1) physical encoding in the fiber optic converter 24, which includes detection of illegal and unused control codes and link-status codes;

(2) byte-synchronization in physical layer, which includes end-of-frame (EOF), (VLF) and sixteen bytes of data;

(3) CRC;

(4) protocol error mechanism in controller 20;

(5) parity checking on busses; and (6) ROM checksum and redundancy in data structures.

Figure 3:
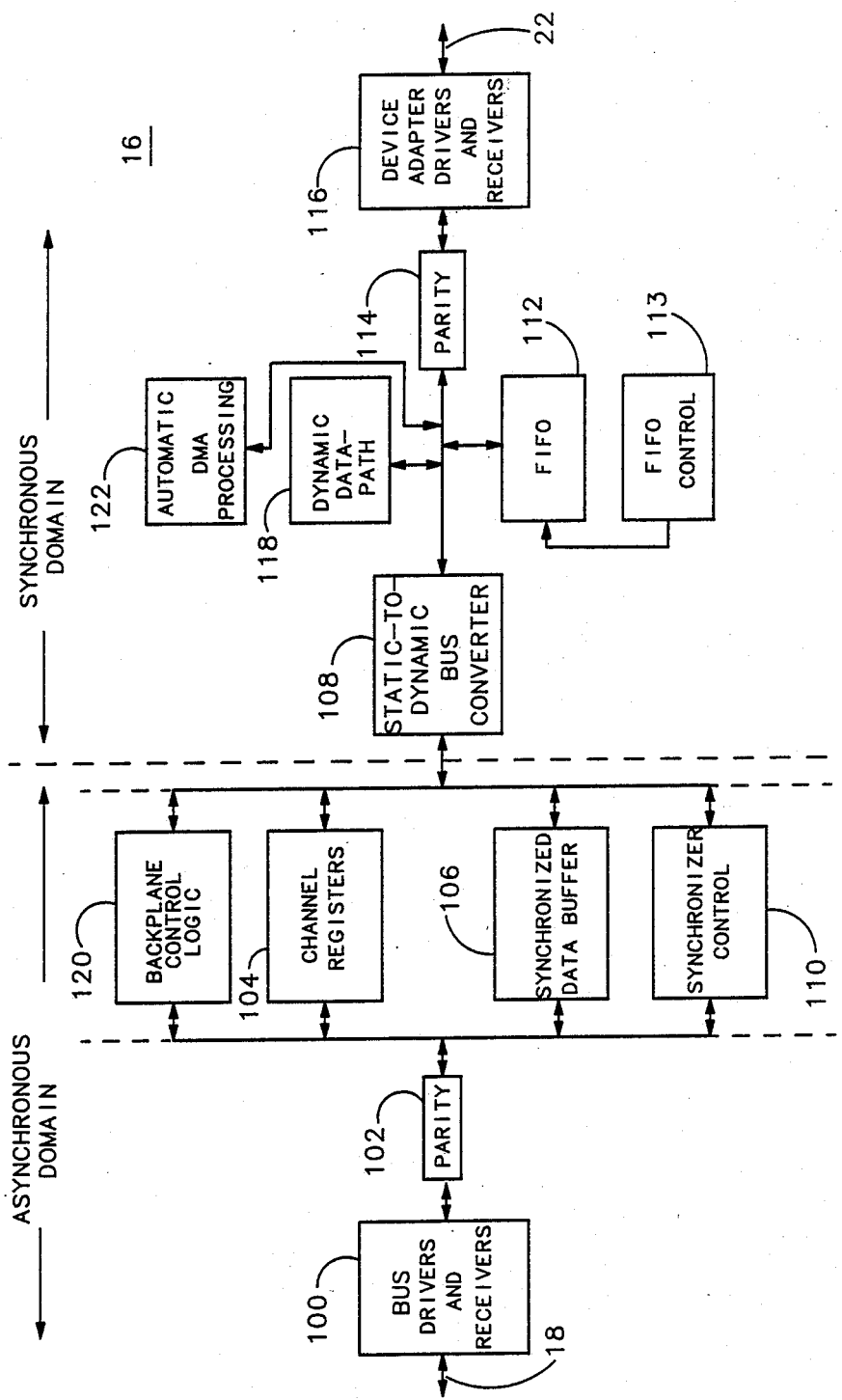
FIG. 3 is a functional block diagram of the Backplane Adapter 16 portion of the instant invention.

With reference now to FIG. 3, a functional block diagram of the Backplane Adapter 16 will be used to describe that block's operation in relation to the other blocks of link adapter 10.

Data on the bus 18 connected to the I/O backplane 12 is generally non-clocked or asynchronous. This data is conducted to and from a Bus Driver and Receiver portion 100 of the Backplane Adapter 16. A parity generator/checker block 102 interconnects the Bus Driver and Receiver block 100 and a channel register block 104 (44 on FIG. 1) and a synchronized data buffer block 106. Data in the portion of FIG. 3 to the left of the dashed line is in an asynchronous domain. Data leaves the Buffer 106 and crosses into a synchronous domain to the right of the dashed line and is conducted to a Static-to-Dynamic Bus Converter block 108.

A synchronizer control block 110, used in conjunction with Buffer 106 compensates for delays in synchronizing data received over bus 18. The Buffer 106 acts as an interface between the asynchronous and synchronous domains. It accepts data from a write side (asynchronous) and sends data to a read side (synchronous). The structure and operation of the synchronized data buffer 106 and synchronizer control 110 are the subject of a related, co-pending application entitled "A SYNCHRONIZING SYSTEM". U.S. patent application Ser. No. 011,352 filed Jan. 30, 1987 which is a continuation in part of U.S. patent application Ser. No. 781,868 filed Sept. 27, 1985. The description therein of the structure and operation of Buffer 106 and Synchronizer 110 is incorporated by reference herein.

Once in the synchronous domain, data flows therefrom through a first-in, first-out (FIFO) 112 (shown in FIG. 1 as block 50) to a parity generator/checker block 114. A Device Adapter Drivers and Receivers block 116 then interconnects the Parity Block 114 with bus 22. A FIFO control block 113 generates signals which allow FIFO block 112 to provide pipelined transmission of data.

In addition to data flow through the Backplane Adapter 16, control information also is conducted through the Backplane Adaptor. This control information path includes the channel register block 104, instead of the Buffer Block 106 and a dynamic datapath block 118, instead of the FIFO block 112. A Backplane control logic block 120 and an automatic direct memory address (DMA) Processing block 122 (46 and 48 on FIG. 1) can access the control information passing through the channel registers 104 and the dynamic datapath 118, respectively.

The Backplane Adapter 16 provides an Automatic DMA List Processing (ALP) function which operates in conjunction with memory 76 of the Processor block 36. As will be described in connection with FIG. 5, infra, the Processor block 36 contains memory which can be directly accessed by the Backplane Adapter. This memory contains linked lists (ALI Lists) which constitute a "snapshot" of the status of a particular channel and device driver. The Processor block 36 in conjunction with the Backplane Adapter 16 can perform actions simultaneously by virtue of the ALI lists and the presence of the Automatic DMA Processing block 122. Such options include the channel operations described hereinabove.

In addition to the DMA path to Processor 36, the Backplane Adapter 16 communicates data to and from the Protocol Controller 20. The FIFO 112, Synchronized Data Buffer 106 and Synchronizer Control 110 permit up to eight million data words per second to be continuously transmitted between the Backplane Adapter 16 and Protocol Controller 20. Six of the twenty-four words stored in the FIFO 112 are utilized for synchronizing this data communications. Reference can be had to the related, co-pending application entitled "A SYNCHRONIZING SYSTEM" for a description of this synchronizing function which is incorporated herein by reference.

Figure 4:
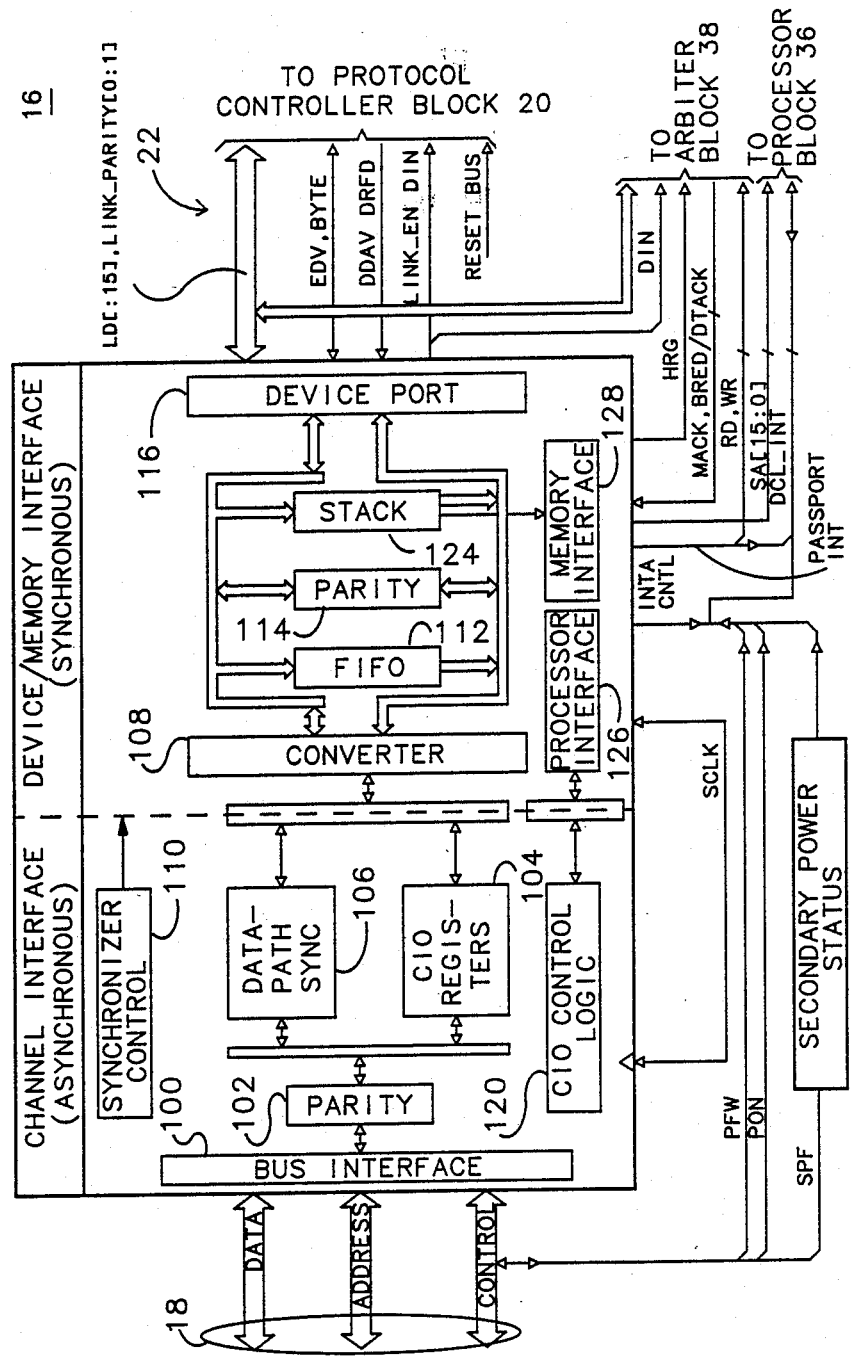
FIG. 4 illustrates the Backplane Adapter 16 of FIG. 3 at a greater level of detail.
Figure 5A:
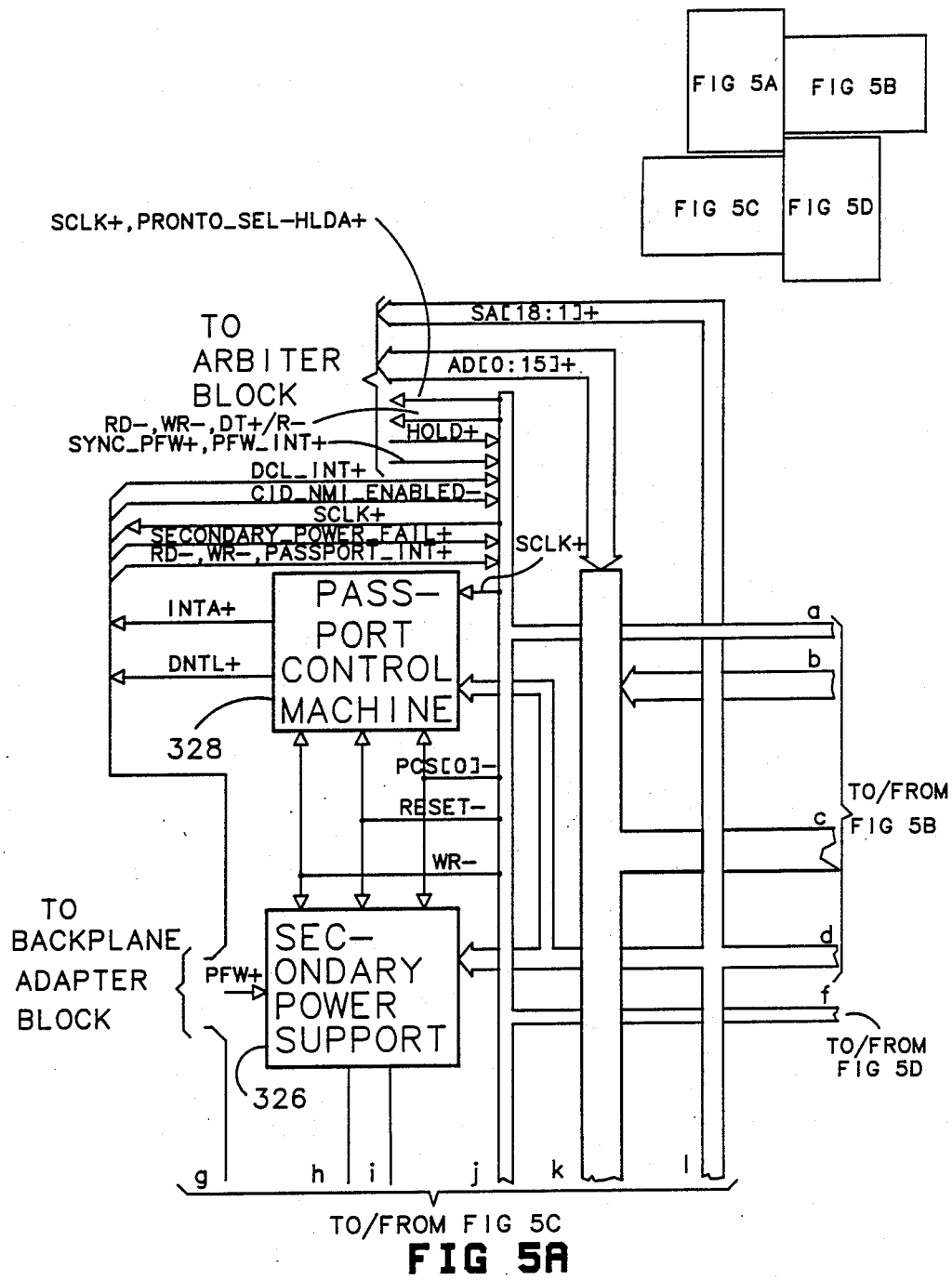
FIG. 5 is a unitary drawing comprising FIGS. 5A, 5B, 5C and 5D, and illustrates the Processor 36 of the instant invention.
Figure 5B:
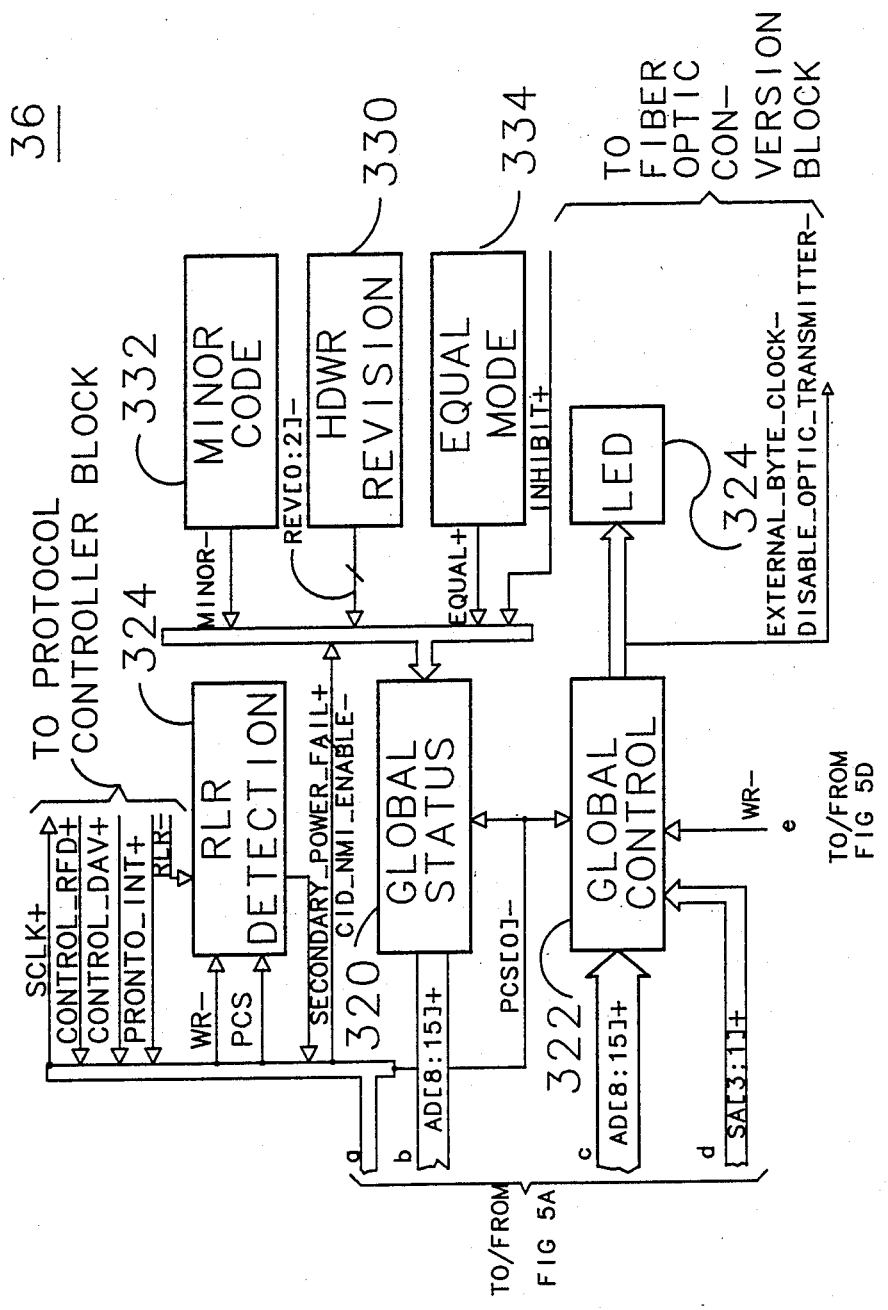
Figure 5C:
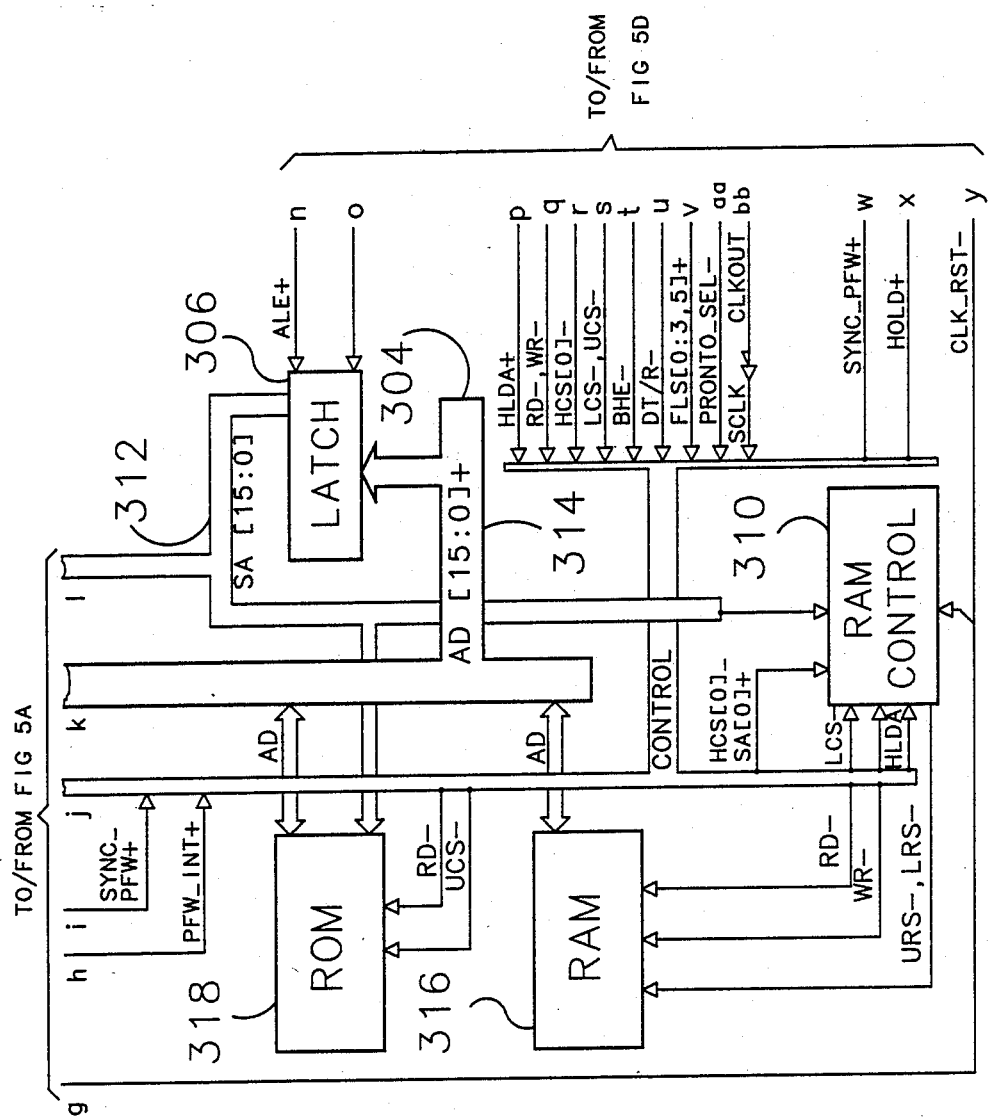
Figure 5D:
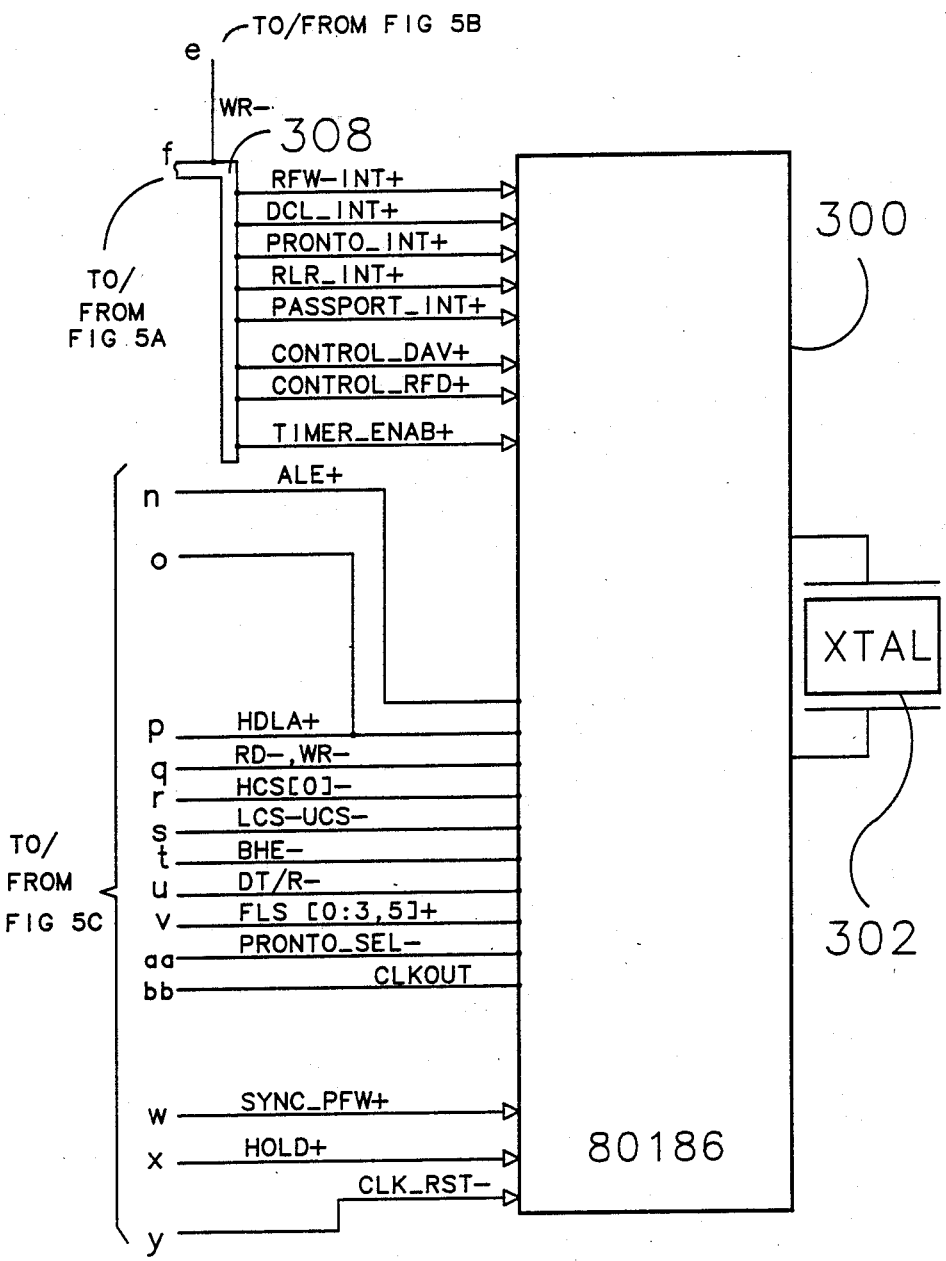

Now with reference to FIG. 4, the structure of Backplane Adapter 16 will be described. The Backplane Adapter 16 serves as a communication path controller between the Process 36, the Protocol Controller 20 and the I/O Backplane 12.

The asynchronous domain portion of Backplane Adapter 16, comprises a channel interface to the asynchronous data on the I/O Backplane 12. The channel interface bus 18 includes a 16 bit data bus DB[0:15]−, two parity bits CDP[0:1]−, and four auxiliary lines {channel end (CEND)−, channel byte (CBYT)−, data end(DEND)− and data byte (DBYT)−}. (The use of + and − following a signal label denotes whether it is asserted at a logic HIGH or LOW level, respectively.) This portion of bus 18 is used for normal I/O communication with the backplane 12 as well as poll cycle operations.

The auxiliary fields are used in conjunction with read and write operations with a Data register in FIFO 112. The two end delimiters, DEND−, and CEND−, indicate the termination of a data transfer in response to an order that required the data register to be read or written. DEND− is only asserted by the Backplane Adapter 16 during read operations. CEND− may be asserted by the channel during either write operations or read operations, with the latter case indicating the channel is terminating the data transfer rather than the device.

Transfers with the Data register may be either packed or unpacked. During packed transfers the byte flag signals, DBYT− and CBYT−, are used to indicate whether a byte or word is being conducted on the data bus. DBYT− will be asserted concurrently with DEND− and only the upper byte DB[0:7]− will be valid. CBYT− must only be received concurrent with CEND− and only the upper byte DB[0:7]− will be accepted. In unpacked transfers, all Data register operations use the lower byte of the data bus DB[8:15]−. Bus 18 also includes an address and a control portion.

The Backplane Adapter 16 has a programmable "parity checking mode" in which Parity block 102 will check and react to parity errors on the Control, Address or Data busses. Parity checking mode is enabled by a channel operation. The Control and Address busses portions of bus 18 are parity protected by the AP− bit. If the AP− bit together with the Control and Address inputs do not form ODD parity, Backplane Adapter 16 enters a Channel Control Parity Error condition and will not assert a myaddress signal (MYAD)− in response to the channel operation. Parity Block 102 will always generate ODD parity on all data bus 18 read operations (except for poll cycles) and drive CDP[0:1]− to appropriate levels. CDP[0]− is used with the upper byte DB[0:7]− while CDP[1]− covers the lower byte DB[8:15]−. If "parity check mode" has been enabled, Parity Block 102 will also check for ODD parity on data during Channel Write operations to all registers except for a write control register. Detection of a parity error will cause Backplane Adapter 16 to interrupt the Processor 36 and indicate a channel Data Parity Error in its control block status if the channel was of the Write Data type, and a channel Control Parity Error if the channel operation was either Write Command or Write_Order.

The Channel Register 104 and Control Logic 120 block consists of a level 2 register set for CIO based implementations, as well as the control logic necessary to update and monitor the register set from both the Channel and the Device/Memory Interface. These blocks implement the various control channel operations described hereinabove in connection with FIG. 1.

The Synchronizer Control 110 and the Backplane Control Logic block 120 work together to determine when a burst request signal (BR)− is asserted during Read Data and Write Data channel operations. BR− will be asserted on the rising edge of an I/O Strobe signal (IOSB)− is the Data Path is capable of immediately completing another transfer in the current direction. Deassertion of the BR signal during a data transfer, and before either DEND− or CEND− have asserted, indicates that the channel must wait for a subsequent service request before proceeding with the transfer.

A Device/Memory Interface comprises the synchronous data portion of Backplane Adapter 16 and manages the flow of data between and I/O Channel (through the Channel Interface) and the Protocol Controller 20 and the Processor 36. It includes the functional blocks FIFO 112, and a STACK 124 which are used for storage. Data flow within this block will be described in terms of two conceptual busses: a deposit bus and a fetch bus.

Clock Domain Conversion circuitry 108 is necessary to assure that data is passed correctly between the synchronous and asynchronous clocking domains.

The FIFO 112 is used to buffer data during all Read Data and Write Data operations. It is 18 transfers deep and stores the state of the data bus 18 and its associated parity bits as well as the auxiliary byte and end delimiters. It accepts data from the Deposit bus and drives the Fetch bus.

The management of the FIFO is such that is can only support an active transfer in one direction. That is, the FIFO cannot interleave Read Data and Write Data operations until a logical breakpoint in the data transfer occurs.

The STACK 124 is used mainly by the Backplane Adapter's Automatic List Processing features in conjunction with a Processor 126 and Memory Interfaces 128 for internal storage of data structures, as well as communication with the Channel Interface during non-Read/Write Data channel operations. It accepts data from the Deposit bus and drives the Fetch bus.

The Parity Generator/Checker circuitry 114 is used to verify that all data that should be guarded by parity on the Deposit bus is valid, as well as generate parity for storage in the FIFO in cases where the data source does not provide parity and applies to data coming from the Memory Interface 128.

The Device Port (116 on FIG. 3) interfaces to the Protocol Controller. It includes a portion of bus 22 consisting of a 16 bit data bus, 2 parity bits, 2 auxiliary bits and 5 control lines. The Device Port Data Bus is 16 bits wide and can be viewed as an upper and lower byte. Each of these bytes is protected by a parity bit. Parity Generator/Checker 114 is programmed at initialization to generate and check for ODD parity. The Data bus is also used for Memory interface. The Auxiliary Bits, EOS+ and BYTE+ are used to indicate data termination and odd data count respectively. These bits are asserted concurrently with data. The EOS+ and BYTE+ bits correspond to the Channel's (DEND−, CEND−) and (DBYT−, CBYT−) data signals. BYTE+ will only be asserted concurrently with EOS+, and the odd byte will be located in the upper byte of the data transfer. LD[0:7]+.

The Backplane Adapter 16 uses five control lines to transfer data to the Protocol Controller 20: DRFD+, DDAV+, LINK_EN+, DIN+, and BREQ+/DTACK−. The first two signals, DRFD+ and DDAV+, stand for "Device Ready for Data" and "Device Data Available", respectively. Backplane Adapter 16 samples these signals to determine whether the Protocol Controller 20 is ready to perform a read or write transaction. Link EN+ is the Link adapter Enable signal which is asserted to indicate that PASSPORT wishes to preform a data transfer. The direction of the transfer is specified by the DIN+ signal. When asserted, DIN+ indicates a Read operation; when deasserted, a Write operation. These signals are described in more detail in the related co-pending application entitled "A SYNCHRONIZING SYSTEM", which description is incorporated herein by reference.

If the Backplane Adapter has been programmed (by the Processor) to perform a Device Port transfer, when the appropriate "Ready" signal appears, Backplane Adapter will drive its LINK_EN+ and DIN+ lines to indicate to the Protocol Controller that an active transfer is to occur. The transfer will occur, if, on the succeeding clock edge, the Protocol Controller's ready signal is still present.

The remaining control line, BREQ+/DTACK− is not used directly at the Protocol Controller interface, but does influence Backplane Adapter 16 behavior during Device Port transfers. The Arbiter Block 38 uses BREQ+/DTACK− as an Immediate Bus Request control to Backplane Adapter. When the Backplane Adapter detects that BREQ+ is asserted it will guarantee that it will release the LD[]+ bus on the following clock cycle (i.e., keep LINK_EN+ deasserted) and will yield control of the bus until the clock cycle following the deassertion of BREQ+.

The Processor Interface 126 is used by Backplane Adapter 16 to determine when it should examine memory 76 for new information and also to inform the Processor 36 that status information is available. The interface is also used to supply power status indication that is taken from the CIO backplane 12.

The Processor interface deals with three signals: CNTL+, INTA+, and PASSPORT INT+.

When Backplate Adapter 16 detects the CNTL+ is asserted it will pick up a block of memory 76 for processing and will process this block depending upon whether this is the first assertion of CNTL+ since a reset condition. In either case, as long as CNTL+ is asserted, the Backplane Adapter will attempt to process the block.

The Backplane Adapter completes the task or CNTL+ is deasserted, it will post status information in memory 76 and assert the interrupt signal INTR−. INTR− in turn, is buffered by an inverter and forms the positive true signal $PASSPORT_{1080}$ *presented to the Processor Block*.

PASSPORT_INT+ remains asserted until Backplane Adapter 16 determines that the interrupt has been acknowledged by finding INTA+ asserted. The Backplane Adapter expects that INTA+ will then deassert completing the Interrupt Handshake.

Two Primary Power Status signals are driven by the Backplane Adapter 16 to the Processor Block PON+ and PFW+. PON+ is the same power indicator signal from the CIO backplane and is merely passed on to the Processor block domain. PFW+ is a buffered and inverted version of PFW− which is also taken from the backplane.

Secondary Power Status is also presented to the Processor block in the form of the SECONDARY_POWER_LOSS+ signal. The assertion of this signal indicates that secondary power was lost during the last recovery from a Primary Power Failure.

All Processor Interface 126 activity is relative to SCLK+ which is provided by the Processor Block.

The Backplane Adapter 16 communicates to the Processor 36 using a shared memory where task lists are received and processed, and status blocks are posted as the tasks are completed. Varying levels of access to the Channel Register set are also provided here. The Memory Interface 128 utilizes a 16 bit address bus of which 13 are used, the data poriton of the Device Data Bus 22 and a Memory Control bus.

The Backplane Adapter's Memory Address bus is a 16 bit bus, SA[15:0]+ of which only 13 bits, SA[13:1]+ are used. These 13 bits address any of 8K words of data in the RAM shared by the Backplane Adapter and Processor blocks and represents RAM addresses 0-3FFEH. If the card has been configured for expansion RAM, address bits SA[15:14]+ are also used, and the address range increases to 0-OFFFEH or 32K words.

The Memory Interface 128 has four output and two input lines used for Memory Control. The signals on these lines are:

MRQ+: asserted by Backplane Adapter to indicate that it wishes to access memory 76;

DIN+: indicates the direction of the transfer, asserting for a Memory 76 Read;

RD+: Memory Read strobe, asserted when Backplane Adapter is ready to have data driven onto its data base;

WR−: Memory Write strobe, asserted when Backplane Adaptor has valid data driven onto the data bus;

MACK+: Memory Acknowledge line, indicating to Backplane Adapter its memory request has been granted by Processor 36;

BREQ+/DTACK−: Data Transfer Acknowledge line, during Memory transfers, indicating that the current Memory operation may complete.

When Backplane Adapter 16 accesses memory 76, it will first assert its MRQ+ line along with the DIN+ line, indicating the type of memory access, read or write, that it intends to perform. If memory is capable of being accessed the MACK+ signal will be asserted. At this point Backplane Adapter has control over all RAM within the Processor block. The presence of MACK+ causes Backplane Adapter to activity drive the SA[]+ address bus. Backplane Adapter then drives RD− or WR− to initiate the memory access and then waits for the data transfer acknowledge signal DTACK− to indicate that data is now setup. Backplane Adapter will then deassert MRQ+ and RD− or WR− to complete the transfer.

RD−, WR−, as well as the SA[]+ bus are normally in a high impedance state. They remain at high-impedance during a memory request until MACK+ is asserted. These control signals then return to their high-impedance state once the memory transfer is complete.

The LD[]+ bus will only be placed in high-impedance once the memory request cycle has begun, and will be driven when MACK+ is asserted only if a Write Memory cycle is active.

Figure 6:
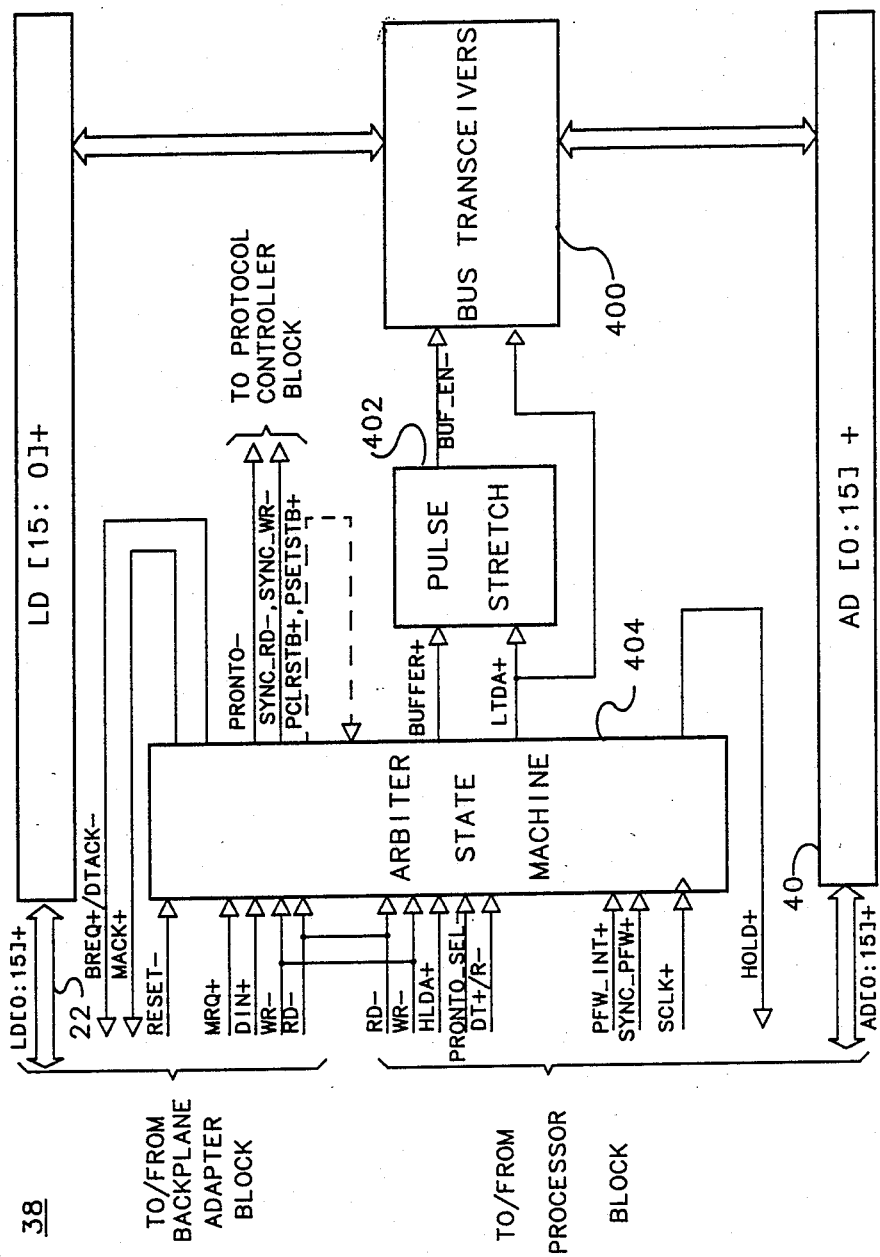
FIG. 6 is a functional block diagram of the Arbiter 38 of the instant invention.

Further details on memory transfers are found in the description of the Arbiter in connection with FIG. 6.

All Memory Interface 128 activity is relative to SCLK+ which is provided by the Processor Block.

Some examples of the internal behavior of Backplane Adaptor 16 during different types of data transfers in its various domains are now presented.

Channel Write Data: Channel to Protocol Controller: In the Channel Interface block 100, data from the host Write Data operation proceeds from the Bus Receivers 100 through the Parity Checker 102, and then into the Data Path Synchronizer 106. The Device Interface will then process it through the Domain Conversion 108 and place it onto the Deposit bus. Parity is checked again 114, and that data is loaded into the FIFO 112. This same data will eventually appear at the output of the FIFO, and assuming the Device Port control signals are in their proper state, data will be presented on the Fetch bus for reception by the Protocol Controller.

Channel Read Data:Protocol Controller to Channel: The Protocol Controller indicates at the Device Port 116 that data is available for pickup. The Device Port handshakes this data and places it on the Deposit bus. Parity is checked and the data is loaded into the FIFO. This data eventually appears at the Fetch bus of the FIFO where it is picked up by the Domain Converter for transfer into the Channel Interface. The Data Path Synchronizer accepts the data and presence of the data will cause a Service Request. The Channel performs a Read Data operation and the bus Drivers transfer data from the Data Path Synchronizer to the Channel.

Channel Write Data: Channel to Memory: In this case, the path from the Channel to the Device/Memory Interface is the same as with the Device Port transfer up until data is ready to be removed from the FIFO. Two things will occur: the memory address where data is to be sent is placed on the fetch bus by the STACK and stored by the Memory Interface. Then, the Memory Interface controller will request access to memory via the Arbiter block. Data from the FIFO is placed on the fetch bus. When the bus request has been acknowledged, the contents of the Fetch bus will be driven onto the Device Port and the appropriate control strobes are issued to load data into Memory.

Channel Read Data:Memory to Channel: For Memory to Channel transfers, Backplane Adapter loads the memory source address from the STACK via the Fetch bus into the Memory Interface and requests access to memory through the arbiter. When acknowledged, data is sampled through the Device Port and driven onto the Deposit bus. Since the data has no parity at this point, the Parity block generates the appropriate parity and also drives this onto the Fetch bus. The entire data unit is then loaded into the FIFO. The remaining portion of the transfer occurs as when the Device Port is the data source.

Other Channel Write Operations: Commands and Orders are written into the Channel Register Block. The action of this operation causes the Backplane Control Logic block to inform the Device/Memory Interface that a new Order or Command is present. The Device/Memory Interface will then cause data from the register in question to be sent to the Domain Conversion block, where it is then placed on the Deposit bus and subsequently loaded into a predetermined location for later use by the STACK.

Other Channel Read Operations: The state of the Channel Read Sense register is updated by special state bits that are synchronized into the Channel Interface. The contents of the Channel Read Status register is updated via the STACK. Status information from a predetermined location within the STACK is placed onto the Fetch bus where it passes through the Domain Conversion into the Channel Status register and the ARQ bit is set in the Read Sense register, indicating that new Status is available.

Command Block and Automatic List Item Read: While processing commands or list item structures or stored in memory, Backplane Adapter 16 will transfer data from memory and ordinarily load it into the STACK. The memory source address from the STACK via the Fetch bus is transferred to the Memory Interface which requests access to memory through the Arbiter. When acknowledged, data is sampled through the Device Port and driven onto the Deposit bus, and then loaded into predetermined locations in the STACK for later usage.

Automatic List Item Write (Updated): Upon completion of list items or upon reception of unexpected commands or orders from the Channel, Backplane Adapter is required to update memory. Two things occur at this point: the memory address where data is to be sent is placed on the fetch bus by the STACK and stored by the Memory Interface. Then, the Memory Interface controller will request access to memory via the Arbiter block. Data to be posted from the STACK is placed on the fetch bus. When the bus request has been acknowledged, the contents of the Fetch bus will be driven onto the Device Port and the appropritae control strobes are issued to load data into Memory.

Miscellaneous Data Path Transfers: One of the test features of the Backplane Adapter is the ability to transfer data between the Protocol Controller 20 and the Memory Interface 128 via the Device Port 116. During these types of transfers, the STACK acts as the intermediate storage unit. There is only one STACK location allocated for this type of transfer so no buffering is possible.

With reference now to FIG. 5, the structure of the Processor 36 will be described. A microprocessor 300 is an 8MHz, 16-bit microprocessor with integrated peripheral circuitry such as interrupt, direct memory access (DMA), timer and bus interface. Microprocessor 300 is preferably organized as an 80186 microprocessor such as manufactured by Intel Corp. The 8MHz dock frequency is derived from a 16 MHz crystal (XTAL)302.

A time-division-multiplexed (TDM) address and data bus AD[0:15]304. (shown as bus 40 in FIG. 1) is connected to a latch 306. Bus 304 interconnects all the major blocks shown in FIG. 5, including the microprocessor 300. Latch 306 receives an address latch enable (ALE) signal from microprocessor 300, as well as a (HLDA) signal, indicating the mircoprocessor has granted the Backplane Adapter 16 access to the memories internal to the processor 36 block.

DMA access is provided by the Processor 36 when the Protocol Controller 20 requests a data transfer. DMA signals are processed by the DMA block internal to microprocessor 300. Interrupt signals for the purpose are conducted to microprocessor 300 as an interrupt bus 308.

The Processor block 36 is memory-mapped and accordingly all elements thereof can be accessed at predetermined memory location. Memory decoding is provided by the Bus interface block internal to the microprocessor 300 and by a RAM Control 310. RAM Control 310 is connected to a System Address SA[15:0] bus 312 conducting memory locations among elements of the processor 36. The SA bus 312 is connected to latch 306, which is controlled by microprocessor 300.

In addition to the ALE and HLDA control signals, microprocessor 300 also generates a write strobe (WR−) signal, a read strobe (RD−) and a Bus High Enable (BHE−) signal which determines whether byte− or work-access to memory is active, a direction line (DT/R− signal indicating whether microprocessor 300 will generate or receive data, a HOLD+ signal indicating the Backplane Adapter is requesting access to shared memory and a synchronized SYNC_PFW+ signal. The signals are conducted as a control bus 314.

The microprocessor 300 contains an internal Chip Select unit which decodes an internal address bus and generates therefrom a line select signal. An upper chip select (UCS−), a lower chip select (LCS−), a middle chip select (MCS[1]−), and a protocol controller 0, 4 and 5 (PRONTO_SEL-[0,4,5]) signal are generated by microprocessor 300 and conducted via control bus 314.

The RAM Control 310 receives control signals from microprocessor 300 and generates therefrom RAM select strobes received by a random access memory (RAM) 316. UPPER_RAM_SEL RAM select signals are generated by RAM control 310 in accordance with Table I.

TABLE I

| LCS− | MCS[1]− | BHE− | SA[0]+ | URS− | LRS− |
|---|---|---|---|---|---|
| 0 | 0 | X | X | 0 | 0 |
| 0 | 1 | 0 | 0 | 0 | 1 |
| 0 | 1 | 0 | 1 | 0 | 0 |
| 0 | 1 | 1 | 0 | 1 | 1 |
| 0 | 1 | 1 | 1 | 1 | 0 |
| 1 | 0 | 0 | 0 | 0 | 1 |

TABLE I-continued

| LCS− | MCS[1]− | BHE− | SA[0]+ | URS− | LRS− |
|---|---|---|---|---|---|
| 1 | 0 | 0 | 1 | 0 | 0 |
| 1 | 0 | 1 | 0 | 1 | 1 |
| 1 | 0 | 1 | 1 | 1 | 0 |

RAM 316 is capable of either byte or word addressing. When a word is accessed whose address is even, both of the RAM select signals are asserted. When a Byte is accessed, or a word that falls on an odd address, only one of the RAM select signals is asserted. Byte access to even addresses select Upper RAM, byte access to odd addresses select Lower RAM. An SA[0]+ signal is asserted during Odd Byte accesses.

RAM 316 consists of two random access memories, an UPPER which is connected to AD[0:7]+ of bus 304 and a LOWER which is connected to AD[8:15]+ of bus 304.

RAM 316 receives the URS-, LRS-, WR- and RD- signals and generates and receives data via bus 304.

The latch 312 latches the contents of the AD[0:15] bus 304 during the address cycle of mircoprocessor 300 and generates signals on the SA[15:0]+ address bus 312. New data is loaded into latch 312 when the ALE+ signal is asserted and held upon deassertion of ALE+.

The HLDA+ signal is a tri-state control signal received by Latch 312. The latch will only drive the bus 312 when HLDA+ is deasserted. This occurs when the microprocessor 300 has not granted the bus to Backplane Adapter 16.

A read-only memory (ROM)318 provides in a preferred embodiment 32K memory locations. ROM 318 receives the RD− and UCS− signals and is accessed when UCS− asserts and data is actively generated on bus 304 when RD− asserts.

A Global Status Register 320 is connected to AD[8:15]+ bus 304 and contains information about revision and configuration of the "card" implementing the Hybrid Data Communications Link adapter of the instant invention.

A Global Control Register 322 is connected to AD[8:15]+ bus 304 and contains information relayed to the Fiber Optics Conversion block 24 and to a set of LEDs 324 used to display status of the Hybrid Data Communications Link. The PCS[0]−, WR− and SA[3:1] signals are employed to effect writing to Registers 320 and 322.

The DMA block integral with microprocessor 300 is used to provide a high-speed data path between the Protocol Controller block 20 and the Processor 36 and it may proceed simultaneously with other operations of Processor 36. A pair of channels, 0 and 1, are used to read and write DMA operations, respectively. When a DMA request appears, the DMA unit of microprocessor 300 acquires control of the busses 304 and 312 and executes the operation. Once the DMA transfer is completed the microprocessor 300 grant control of the busses to Backplane Adapter 16 via the Ariber 38.

A DMA write operation is performed when a CONTROL_RFD+ signal has been asserted and DMA channel 1 is currently enabled. Data is then fetched from memory (316 or 318) at a location pointed to by a channel 1 source address pointer and then written to the Protocol Controller 20 on the following bus 304 cycle. The DMA unit samples the CONTROL_RFD+ signal again during the write to determine whether another word is to be sent to Protocol Controller 20.

A DMA read operation transfers data from the Protocol Controller 20 to RAM 316. Once DMA Channel 0 has been enabled, a CONTROL_DAV+ signal is sampled by microprocessor 300. When CONTROL_DAV+ is asserted the DMA unit of microprocessor 300 acquires bus 304 and reads a word of data from Protocol Controller 20 to RAM 316. The word is written to a memory location determined by the contents of a destination address register.

An Interrupt Controller integral to microprocessor 300 monitors and responds to interrupt/signals received on the interrupt bus generated by Backplane Adapter 16, a (RLR) Remote Link Reset detection block 324 or the Protocol Controller 20. Signals PASSPORT_INT+, RLR_INT−, and PRONTO_INT+ are generated therefrom, respectively.

Also a power fall warning interrupt (PFW_INT)+ signal is generated by a Secondary Power Support 326 and a Device Clear Interrupt (DCL_INT+) signal is received from the Backplane Adapter 16.

A Passport Control Machine 328 block generates handshaking signals which permit transmission of data between RAM 316 and Backplane Adapter 16. A CNTL+ and INTA+ signal are generated by Passport Control Machine 328 and conducted to Backplane Adapter 16.

The RLR Detection block 324 is accessible by the Protocol Controller 20 by assertion of the RLR-signal. A Hardward Revision code block 330, a minor Code Block 332 and an Equal Mode Block 334 are accessible to the Global Status Register 320 via a bus 336. These blocks store "card" configuration information.

With reference now to FIG. 6, the Arbiter 38 is illustrated in block diagram form. The link adapter data (LD[0:15]+) bus 22 connects the Protocol Controller 20 and the Backplane Adapter 16 and address-data (AD[]+) bus 40 connects the Artiber 38 to the Processor 36. Operations that entail Backplane Adapter 16 gaining access to memory internal to Processor 36 or in which the Processor 36 gaining access to the Protocol Controller 20 are handled by Artiber 38.

A Bus Transceiver 400 portion of Arbiter 38 interconnects the LD bus 22 and the AD bus 40. A link adapter transmit output arbiter (LTOA+) signal is received by the bus Transceiver 400 and establishes the direction of data flow between the two buses. A buffer enable (BUF_EN−) signal is received by Transceiver 400 which enables two bus isolation transceivers within block 400.

When asserted, LTOA+ will cause data to flow from LD22 to AD40, provided BUF EN− is asserted. When LTOA is unasserted data flows from AD 40 to LD 22, provided BUF_EN is not asserted. When BUF_EN− is not asserted, the busses are isolated.

A PULSE STRETCH block 402 to selectively lengthen the time during which BUS TRANSCEIVER 400 is enabled. When direction of data transfer is from LD22 to AD40 the PULSESTRETCH block is held inactive by virtue of a FALSE TLOA signal generated by an Arbiter State machine 404 portion of Ariber 38. In this case the BUF_EN− signal follows BUFFER+ signals generated by Arbiter State Machine 404.

When the direction of data transfer is from AD40 to LD22 the PULSESTRETCH 402 is activated by virtue of LTOA being TRUE. The BUF_EN− signal generated by PULSESTRETCH 402 then follows a BUFFER+ signal generated by Arbiter State Machine 404 with a half-inter-state time delay. This stretch BUF_EN− provides additional time for transfers from AD40 to LD22. When the LTOA signal returns to FALSE, the BUF_EN− signal is deasserted.

When the Processor 36 requests the Arbiter 38 to access the Protocol Controller 20, the Arbiter responds by forcing the Backplane Adapter 16 to relinquish the LD[]+ bus 22 and then the Processor 36 generates appropriate signal for the control Port 52 to access the Protocol Controller. After the access has completed, the Arbiter 38 determines whether the Backplane Adapter will proceed.

The Arbiter State Machine 404 receives the RD−, WR−, HLDA+, PRONTO_SEL−, DT/R−, PFW_INT+, SYNC_PFW+ and SCLK+ signals from the Processor 36. It also receives the RESET−, MRQ+, DIN+, WR− and RD− signals from Backplane Adapter 16. It generates SYNC_RD−, SYNC_WR− signals to the Protocol Controller 20, MACK+ and BREQ+/DTACK− signals to the Backplane Adapter 16 and HOLD+ signal to Processor 36.

Figure 7:
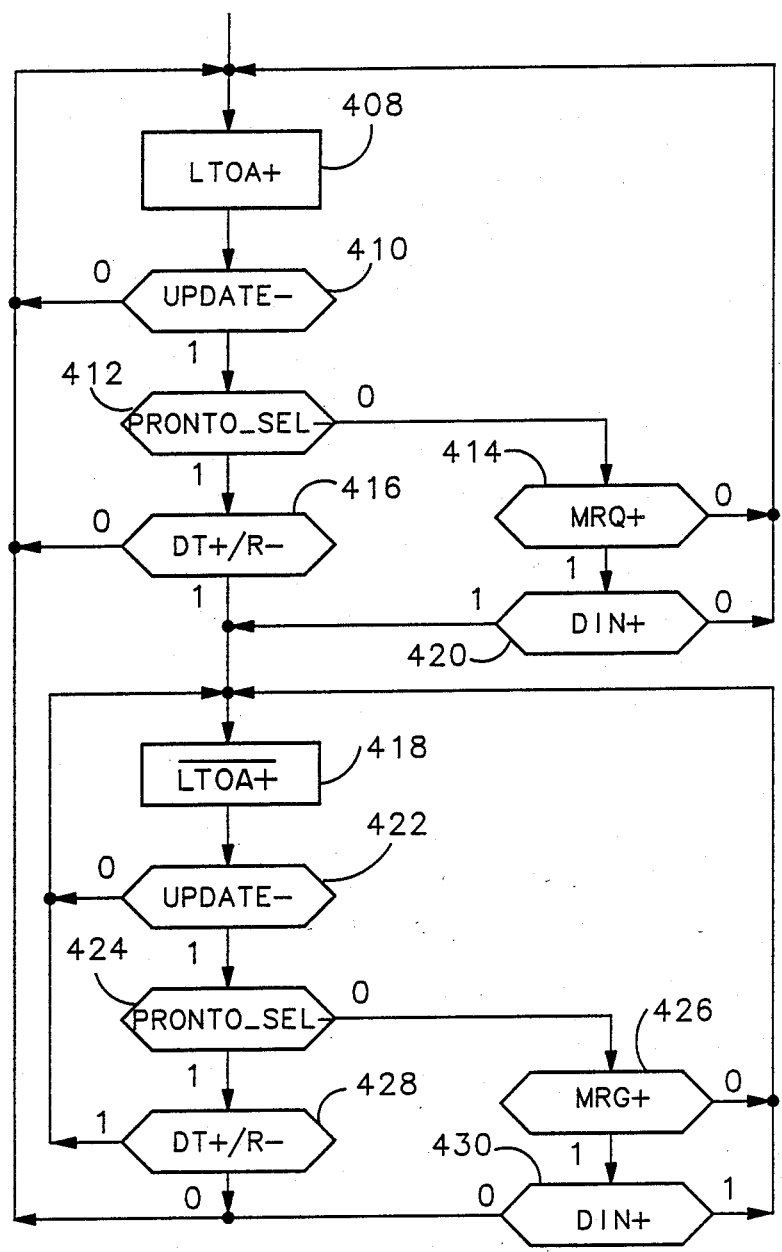
Figure 8:
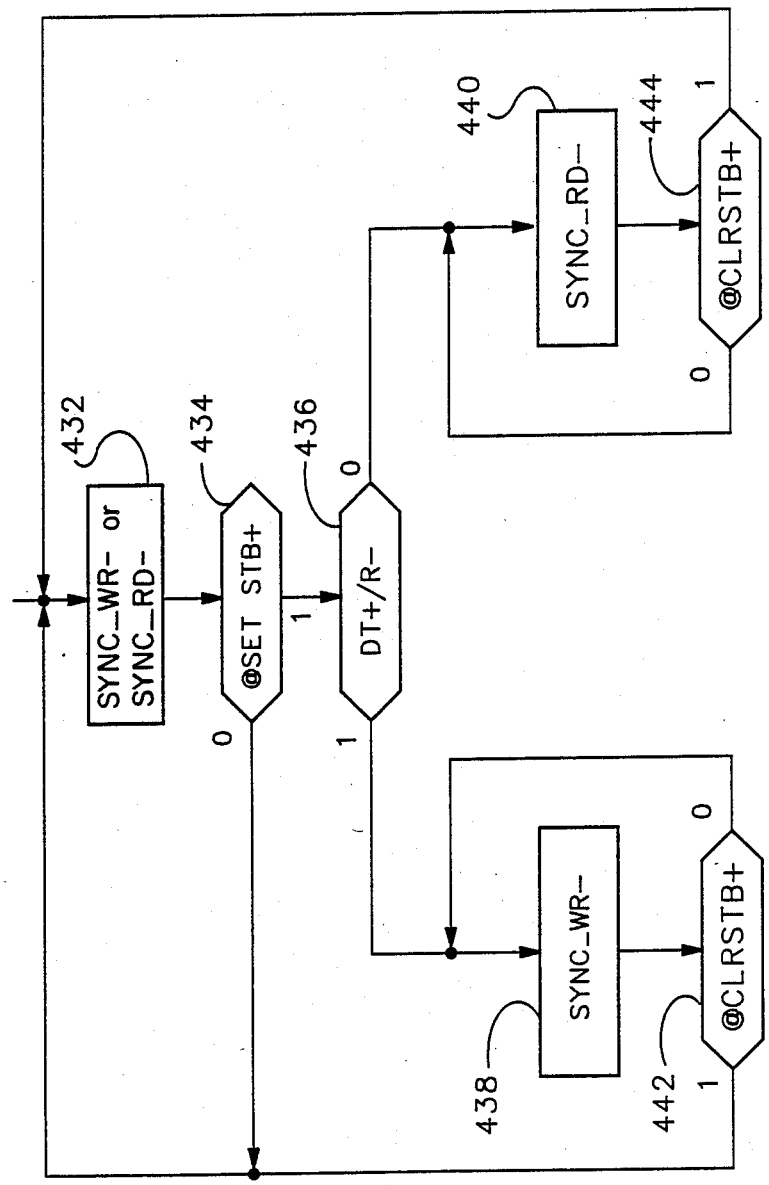

FIGS. 7, 8 and 9 contain state-transition diagrams which indicate reception and generation of the signals by Arbiter State Machine 404. These state-transition diagrams will be referred to in the following description of the Arbiter State Machine.

With reference to FIG. 7, a Direction state-transition diagram is illustrated. The Direction state machine forms a portion of Arbiter State Machine 404 and controls the LTOA+ signal, which in turn, determines the direction of transfers between LD bus 22 and AD bus 40, as described above in connection with FIG. 6. The Direction state machine operates so that the LTOA+ signal will change (state 408) only when an UPDATE− signal is asserted (state 410) and either Processor 36 or Backplane Adapter 16 is attempting to control the Bus 22 by asserting a PRONTO_SEL− (state 412) or MRQ+ state (414) signal, respectively. A Data Transmit (DT/R) signal asserted by Processor 36 during write operations and deasserted during read operations (state 416) determines whether the next state after 416 is 408 or a state 418. Accordingly, whether LTOA+ is asserted (state 408) or deasserted (state 418), respectively. Similarly, a Data In (DIN+) signal generated by Backplane Adapter is asserted or deasserted to a state 420, determines whether the next state after 414 will be 408, respectively.

A set of states 422, 424, 426, 428 and 430, analogous to 410, 412, 414, 416 and 420, respectively, determine the sequence of the Direction machine when it is in the LTOA deasserted state 418. Following this latter portion, return is either to state 408 if LTOA+ is to be asserted or to state 418 if LTOA+ is to be deasserted.

With reference to FIG. 8, a Read/Write Generation state-transition diagram is presented; illustrating a portion of the operation of Arbiter State Machine 404. Initially in state 432, reception of a Set Strobe (SETSTB) from transits to state 434. An asserted DT/R signal at state 436 causes generation of a SYNC_WR signal (state 438); a deasserted DT/R signal causes generation of a SYNC_RD signal (state 440). These signals are conducted to Protocol Controller 20. Reception following state 438 of an asserted clear strobe (CLRSTB) signal at state 442 causes return to state 432, while reception of a deasstered CLRSTB signal causes return to state 438. At state 440, reception (state 444) of a deasserted CLRSTB signal cause return to state 432, while reception of a deasserted CLRSTB signal causes return to state 440.

When the Processor 36 makes a request to the Arbiter 38 to access the Protocol Controller 20, the Artiber responds by forcing the Backplane Adapter 16 to relinquish the LD[]+ bus 22. The Arbiter then sequences through the proper control strobes for Control Port 52 access of the Protocol Controller 20. After the access has completed, the Arbiter then decides whether to allow the Backplane Adapter to proceed again.

With reference to FIG. 9, the Arbiter 38 takes two slightly different paths depending upon whether the Processor 36 is performing a read or a write operation. The Processor 36 inserts two wait states into its normal 4 cycle bus operation when accessing Pronto 20. The corresponds to a bus cycle progression of <TI>, <T2>, <T3>, <TW1>, <TW2>, <T4>. It will sample data on the leading edge of bus state <T4>, which is the beginning of the sixth bus cycle.

In describing the state-transition diagram, FIG. 9, of Arbiter 38, the signals UPDATE, BREQ, SELECT, BUFFER AND MACK generated by Arbiter 38 are treated as a single vector. The signal generated at a state is shown by a number, e.g. IDLE 04, indicating that a binary 4, e.g. 00100 is to be generated at this stage, 00100 indicating UPDATE=0, BREQ=0, SELECT=1, BUFFER=0 and MACK=0. The state sequence for a Processor Read from Protocol Controller 20 as follows:

Arbiter State: <IDLE04>450 microprocessor the Arbiter idles in this state waiting of the assertion of PRONTO_SEL− (or a memory request (MRQ+) from Backplane Adapter). When PRONTO_SEL− is asserted (state 452) the Arbiter (state 454) checks the sense of DT/R− to see whether a read or write operation is intended. (FIG. 7) For a read, DT/R−−=LOW and the arbiter waits for the assertion of RD− (state 456), which will occur in the next state.

Arbiter State: <IDLE04>450 microprocessor on the leading edge of this stage, the Direction Machine (FIG. 7) determines that the Processor has a read request pending and asserts LTOA+. The Processor asserts RD− during <T2>, which is detected by the arbiter and causes it to change state.

Arbiter State: <PRON28>458 microprocessor: <T3> on the leading edge of this state the Direction Machine determines that the processor still has a read request pending and continues to assert LTOA+. At this point, the Arbiter has deasserted its UPDATE− signal, indicating it is active. It also issues a bus request to the Backplane Adapter for the link adapter bus by asserting BREQ+, which guarantees that the bus will be available on the next state.

Arbiter State: <PRON24>462 microprocessor <TW1> the Arbiter then assets PRONTO− and SYNC_RD− to Protocoller controller to begin the read.

Arbiter State: <PRON26>264 microprocessor <TW2> data from Pronto becomes valid on the LD[] bus 22 during this state. The Arbiter asserts BUFFER+ which causes BUF_EN− to assert. BUF_EN− being true turns on bus transceivers 400 allowing data on the LD[]+ bus 22 to be driven onto the AD[] bus 40. The assertion of Buffer+ is also detected by the pulse stretcher 402 on the rising edge causing STRETCH+ to assert. If RD is asserted (state 466) then Arbiter enters.

Arbiter State <PRON08>468 microprocessor: <T4> the processor samples data on the leading edge of this bus cycle. The Arbiter deasserts BUFFER+ but BUF_EN− remains asserted for another half clock cycle due to STRETCH+. This satisfies the processor data hold time specification. A CLRSTB signal is generated (state 470).

Arbiter State: <IDLE12>472 microprocessor: <T1> the Arbiter deasserts SELECT− and SYNC_RD−. Protocol controller requires two states to recover before processing another Device Port access. Therefore the arbiter continues to assert BREQ+. Since the processor is in its <T1> state, it is possible that another arbiter request is present. If a Protocol Controller Write request is present, the Arbiter transits into the Write Request path at <PRON28> (state 458), otherwise the Arbiter returns to the <IDLE04> (state 450). The Arbiter verifies the presence of a Protocol Controller Write Request by checking the sense of PRONTO_SEL− state 474 and DT/R− (state 496) to see whether an operation is intended, and if so, whether it is a read or a write (state 478).

Arbiter State: <IDLE04>450 microprocessor: <T2> BREQ+ had been deasserted, which will allow the Backplane Adapter to being a Device Port transfer if one is able to be made. The general behavior of the aribter in this state has been previously described earlier in the read request discussion if a Protocol Controller Read request is present. If no request is present, the Arbiter will continue to remain in the idle state until either the Processor or the Backplane Arbiter does issue a request.

The processor has been internally programmed by insert two wait states into its bus cycle for a Write Pronto Register operation. Data is presented on the AD[]+ bus 40 for sampling sometime during bus state <T2>. The arbiter state sequence for a processor write to Protocol Controller is a follows:

Arbiter State: <IDLE04>450 microprocessor: <T1> the arbiter has been idling in this state waiting of the assertion of PRONTO_SEL−. When PRONTO_SEL− is asserted (452) the arbiter checks the sense of DT/R-(454) to see whether a read or write operation is intended. Since this is a Write operation, DT/R−−=HIGH and the arbiter immediately proceeds to the next state 458.

Arbiter State: <PRON28>458 microprocessor: <T2> on the leading edge of this state, the Direction machine (FIG. 7) deasserts LTOA+, setting up the bus transceiver 400 for processor write operation. The Arbiter deasserts its UPDATE− signal, indicating it is active. It also asserts BREQ+, indicating to Passport that the arbiter wants the LD[] bus on the next clock cycle. SETSTB is generated at state 460.

Arbiter State: <PRON24>462 microprocessor: <T3> the Arbiter than asserts and PRONTO− and SYNC_WR− to Protocol Controller to begin the Pronto Register Write.

Arbiter State: <PRON26>464 microprocessor: <TW1> the Arbiter asserts BUFFER+ which causes BUF_EN− to assert, enabling bus transceivers 400. Data from the AD[]+ bus is driven onto the LD[]+ bus. The pulse stretcher 402 is disabled since LTOA+ is false. Since RD is deasserted state 466 causes transition to an Arbiter State 480.

Arbiter State: <PRON10>480 microprocessor: <TW2> data on the LD[]+ bus is sampled by Protocol Controller on the leading edge of this state. Return is to a CLRSTB signal is generated (state 482).

Arbiter State:<IDLE04>450 microprocessor:<T4>the Arbiter deasserts BUFFER+ and therefore BUF_EN− (since there is no stretching here) as well as SYNC_WR− and SELECT−, completing the Pronto access. BREQ+ is deasserted, indicating to Backplane Adapter that the bus request has completed.

Arbiter State:<IDLE04>450 microprocessor:<T1>the Arbiter remains in the idle state, waiting for its next request.

The Arbiter will always grant consecutive Processor requests to the LD[]+ bus 22 without any holdoff over any number of consecutive machine cycle requests.

The Arbiter is designed such that no more than two consecutive Processor requests can occur without the Backplane Adapter getting at least one clock cycle in which to transfer data across the LD[] bus.

Even under complete loading by the Processor, the link adapter data bus 22 is still capable of at least 1 transfer every 6 clock cycles, which results in a link adapter throughput of 2.7 Mbytes. The Arbiter also processes Backplane Adapter access requests for RAM 316.

Microprocessor 300 uses a Hold/Hold Acknowledge handshake to transfer control of its external busses. The assertion of HOLD+ causes the microprocessor to relinquish its busses at the next convenient opportunity, usually within 2 to 3 clock cycles. To indicate that this has occurred the microprocessor then asserts HLDA+ to acknowledge that the hold request has been granted. HLDA+ will remain asserted until the holding condition is removed by the deassertion of HOLD+.

Ordinarily all Backplane adapter Memory Requests will cause HOLD+ to be asserted. Once HLDA+ has been asserted the RAM Control 310 asserts both of the RAM select lines, UPPER_RAM_SEL−, LOWER_RAM_SEL−. The RAM Control ignores any Processor information until HLDAF+ has been deasserted.

In the case of a Memory Read, there are a variable number of wait states after MRQ+ is asserted until the processor commpletes its acknowledge as well as 1 fixed wait state that is always asserted after<P3>. Thus the Memory Read bus cycle sequence from Backplane Adapter's perspective would appear as<P1>, [variable≠ of<Pw1>], <P2>, <P3>, <PW>, <P4>.

A Backplane Adapter Read Memory operation appears on FIG. 9 as the following Arbiter state sequence:

Arbiter state:<IDLE04>450 Backplane Adapter-:<P1>the Arbiter remains in the IDLE04 state 450 until the processor assert HLDA+ state 486. Backplane Adapter is in a bus wait state. Depending upon when MRQ+ was asserted, the arbiter may have to wait from 2 to 5 clock cycles unti the HLDA+ signal is returned. The eventual assertion of HLDA+ also asynchronously causes two other events to occur. First, the address latches 306 will be disabled, tri-stating the address bus SA[]+312. Secondly, the two RAM 316 select lines {URS-,LRS-} will be asserted. This behavior will be maintained until HLDA+ is removed. If DIN is asserted (state 488) Arbiter enters.

Arbiter state:<MEM31>490 Backplane Adapter-:<P2>the arbiter asserts MACK+ which will be detected by Backplane Adapter on the leading edge of the next cycle, indicating that Backplane Adapter may begin its read operation. The assertion of MACK+ also allows Backplane Adapter to drive the SA[] bus 312. The data path between the LD[]+ and AD[]+ buses is linked by the asserting of BUFFER+ and thus, BUFF_EN−, which, since LTOA+ is false, will cause data from the AD[]+ bus to appear on the LD[]+ bus via Bus Transceivers 400. Because the Memory data path is not quite fast enough to satisfy Backplane Adapter's timing, a memory wait state is setup by de-asserting DTACK−. UPDATE− is now false, and the direction machine (FIG. 7) locks into the state with LTOA+ false.

Arbiter state:<MEM31 >490 Backplane Adapter-:<P3>Backplane Adapter asserts RD− (state 492) and data from the RAMs begins to propagate to the LD[] bus. The arbiter holds DTACK− deasserted, forcing Backplane Adapter to stretch the read another cycle.

Arbiter state:<MEM23>494 Backplane Adapter-:<P3s>DTACK− is asserted by the arbiter, allowing Backplane Adapter to terminate the read state 496.

Arbiter state:<MEM22>498 Backplane Adapter-:<P4>Backplane Adapter samples data from the LD[]+ bus on the leading edge of this cycle. Backplane Adapter then deasserts MRQ+ and RD−, and the ariber deasserts MACK+ completing the read operation.

Arbiter state:<MEM20>500 Backplane Adapter-:<>the Arbiter disables the AD[]+ to LD[]+ data path by deasserting BUFFER+. It now waits for the HLDA+ signal to be deasserted by the processor, which will allow it to complete the arbitration state 502. When HLDA+ deasserts, the address latch 306 is re-enabled and the RAM 316 select lines are deasserted.

In the case of a RAM Memory Write by Backplane Adapter, there are a variable number of wait states after MRQ+ is asserted until the processor completes its acknowledge. There are no memory wait states for a write operation. Thus the Memory Write bus cycle sequence from Backplane Adapter's perspective would appear as <P1>, [variable ≠ of<Pw1>], <P2>, <P3>, <P4>.

A Backplane Adapter Write Memory operation appears as the following arbiter state sequence:

Arbiter state:<IDLE04>450 Backplane Adapter-:<P1>the Arbiter detects the assertion of MRQ+ state 484. HLDA+ is false(484), however, so the arbiter remains in its current state 450. Since the arbiter is still in the UPDATE− state, the direction machine detects MRQ+ asserted and DIN+ deasserted and asserts LTOA+, since data will be transferred from LD[]+ to AD[]+.

Arbiter state:<IDLE04>450 Backplane Adapter-:<P1w>the Arbiter remains in the IDLE04 state until it sees the processor assert HLDA+. Backplane Adapter is in a bus wait state. Depending upon when MRQ+ was asserted, the arbiter may have to wait from 2 to 5 clock cycles until the HLDA+ signal is asserted (State 486). The eventual assertion of HLDA+ also asynchronously causes two other events to occur. First, the address latches 306 will be disabled, tri-stating the address bus SA[]+. Secondly, the two RAM select lines {URS-,LRS-} will be asserted. This behavior will be maintained until HLDA+ is removed.

Arbiter state:<MEM23>494 Backplane Adapter-:<P2>the arbiter asserts MACK+ which will be detected by Backplane Adapter on the leading edge of the next cycle, indicating that Backplane Adapter may begin its read operation. The assertion of MACK+ also allows Backplane Adapter to drive the SA[] bus 312.

The data path between the LD[] and AD[] busses is linked by the assertion of BUFF+ and thus, BUF—EN—, which, since LTOA+ is true, will cause data from the LD[]+ bus to appear on the AD[]+ bus. Data must be valid on the trailing edge of Backplane Adapter write pulse, STRETCH+ is asserted midway through this cycle. Memory 316 is fast enough to processor the Backplane Adapter write access, so DTACK— is asserted. UPDATE— is now false, and the direction machine locks into the state with LTOA+ true.

Arbiter state:<MEM23>494 Backplane Adapter-:<P3>Backplane Adapter asserts WR— (state 504).

Arbiter state:<MEM20>500 Backplane Adapter-:<P4>Backplane Adapter deasserts MRQ+ and WR—, and the arbiter deasserts MACK+ completing the write operation.

The Arbiter deasserts BUFFER+. However STRETCH+ remains asserted for another half cycle, keeping BU_EN— asserted until mid-cycle. At that point the bus transceivers 400 are disabled, and the LD[] and AD[] busses are isolated. Arbiter waits for the HLDA+ signal (state 502) to be deasserted by the processor, which will allow it to complete the arbitration. Until then, return to state 500.

Arbiter state:<MEM20>500 Backplane Adapter-:<>when HLDA+ deasserts, the address latch 306 is re-enabled and the RAM 316 select lines are deasserted. The arbiter then returns to its idle state 450 from state 502.

Arbiter state:<IDLE04>450 Backplane Adapter-:<>UPDATE— is asserted again, indicating that the Arbiter is capable of processing another request.

If both Backplane Adapter 16 and Processor 36 simultaneously request access to the other's busses, the Arbiter 38 will always grant the Processor's request. If Backplane Adapter makes such a request while Arbiter is under Processor control, the Arbiter ignores any such requests until it is IDLE 04 state 450 or IDLE 12 state 472. The result is that Backplane Adapter will wait between 3 and 8 clock cycles before MACK is asserted.

With reference again to FIG. 1, a brief description of link adapter 10 will now be presented:

When a Channel sends an order to the link, the data travels from the I/O Backplane (IOB) to the Backplane Adapter FIFO 50. The Backplane Adapter discovers that the CLC does not match any of the entries in the lists provided by the Processor block 36, and therefore gains access to Memory 76 through the Arbiter 38 and transfers the channel data into it.

The microprocessor 74 is alerted of this new data parses it, and adds a Logchannel and a Virtual Circuit pair to its list of requests. Since there no pending requests, the Processor builds up an RTS Header which includes the new Virtual Circuit. This initial RTS is used to mark the beginning of the Command Phase.

The microprocessor 74 issues a request to the Arbiter 38 to access the Protocol Controller 20 and proceeds to send the RTS Header out through the Control Port 52. The RTS passes through the outbound FIFO 64, has control and CRC information added to it, and is then sent to the Tx portion of the fiber optic conversion block 24.

The Fiber optic Block serializes the data, converts it into a photon stream and send it out onto the fiber optic frontplane 14.

When the RTR Header appears on the fiber, it is converted back to parallel form by the Fiber optic block Rx section and passed on to the Receive Port of the Protocol Controller block. The Protocol controller determines that the data is valid and is the expected buffer in the current sequence. The RTR Header is then placed in the Inbound FIFO.

The Processor retrieves the RTR Header from the Protocol Controller, checks its Virtual Circuit and thus determines that the remote device is ready to proceed with the Command Phase.

The Command Phase of link adapter 10 has two basic steps: the Switch and the actual Command Data Transfer.

During the Switch, the processor block 36 prepares the link adapter and the channel for the transfer of command data. In the case of the link, the link adapter sends out a DAT Header onto the link adapter via the Arbiter and Protocol Controller, which indicates to the remote device that the actual Command Data is to follow. Just before sending out the data header, the Processor placed the Protocol Controller in Transmit Automatic Mode. This special mode will cause the Protocol Controller to SWITCH from the Control Port 52 to the Device Port 54 once the header has passed through the Control Port.

For the channel, the Processor 36 programs the Backplane Adapter 16 to respond to a Read Transparent Status (RTS) Order with a SWITCH to Logchannel, n. It also tells the Backplane Adapter to expect a Write Data order to follow and to transfer the incoming data to the Protocol Controller.

During the Command Data Transfer, the channel sends the Write Data order, which the Backplane Adapter accepts, and then lets the incoming data pass through it and into the Protocol Controller where it is readied for transfer onto the link.

When the Backplane Adapter encounters a word tagged with an end delimiter, it passes this final transfer to the Protocol Controller and then waits for the next list of events to be supplied by the Processor.

When the Protocol Controller encounters the last word (byte), it flags this event by marking a bit in the level 2 header and points its Transmit Switch back to the Control Port.

Before the actual Execution Phase data is transferred, the link adapter 10 waits for the remote device to request use of the desired virtual circuit by an RTS Header.

When the Processor sends out the acknowledging RTR Header, it proceeds through the Arbiter to the Protocol Controller, as before.

Once the RTR Header has been sent, the Processor provides a new list of events for the Backplane Adapter to follow. It programs the Backplane Adapter to wait for the Protocol Controller ot indicate that it has data, respond with a SWI, n. to the next Read Transparent Status Order, and then wait for a Read Data order, at which time it will transfer data from the Protocol Controller to the Channel.

Meanwhile, the Processor places the Protocol Controller in Receive Automatic Mode. This is similar to the Transmit Auto mode, in that once the DAT header is received, the SWITCH points to the Device port, and the remaining incoming data will transfer through this port.

Assuming that the adapter has received the DAT header, the Protocol Controller will now indicate that it has data at the Device Port. Backplane Adapter will proceed through the RTS Order and start passing the Execution Phase DATA from the Protocol Controller.

What is claimed is:

1. An adapter between a backplane, providing a connection of data terminal equipment (DTE), and a frontplane, providing a connection to a communication media, comprising:
   backplane adapter means responsive to a first plurality of processor control signals received at a first port, and asynchronous control and data signals received from said DTE in a plurality of channels, for generating at a second port synchronous control and data signals therefrom and for receiving at said second port synchronous signals and for generating therefrom at said first port said asynchronous signals;
   protocol controller means responsive to a second plurality of processor control signals, receiving said synchronous signals generated at said second backplane adapter port, for generating therefrom signals formatted according to a predetermined protocol suitable for transmission over said communication midia, and receiving signals formatted according to said protcol, for generating therefrom said synchronous signals received at said second backplane adapter port;
   converter means connected to said frontplate receiving said formatted signals generated by said protocol controller means for generating therefrom signals onto said communication media and receiving signals from signals received by said protocol controller; and
   processor means responsive to said synchronous control signals, having a memory operabley connected to said backplane adapter means and to said protocol controller means, for generating said first and said second plurality of processor control signals; said memory being directly accessible (DMA) to said backplane adapter means and to said protocol controller means.

2. An adapter according to claim 1 wherein said backplane adapter means further generates a plurality of control signals further including a first bi-directional bus interconnecting said backplane adapter means and said protocol controller means, and a second bi-directional bus interconnecting said first bi-directional bus and said processor means, said adapter further comprising:
   arbiter means operably disposed on said second bi-directional bus and responsive to said control signals generated by said backplane adapter means and said processor means for generating signals received by said processor means permitting control of said first and said second bus selectively by said backplane adapter means or said protocol controller means;
   said second bi-directional bus conducting signals addressing said processor means memory.

3. An adapter according to claim 2 wherein said memory stores tasks for said backplane adapter to execute said tasks to be undertaken simultaneously with operations by said processor means.

4. A link adapter according to claim 3 wherein said processor means memory comprises:
   a random access memory (RAM) portion; and
   a read-only memory (ROM) portion; and
   wherein said RAM is directly accessible by said backplane adapter means and by said protocol controller.

5. A link adapter according to claim 1 wherein said backplane adapter means includes first data protection means receiving said asynchronous control and data signals for ascertaining the parity of said data signals, for generating a signal indicative of a parity error and for generating a parity signal to be appended to said data signals.

6. An adapter according to claim 1 wherein said backplane adapter means includes second data protection means receiving said synchronous control and data signals for ascertaining the parity of said data signals, for generating a signal indicative of a parity error and for generating a parity signal to be appended to said data signals.

7. An adapter according to claim 3 wherein said tasks are represented by doubly-linked lists stored in said processor means memory.

8. An adapter according to claim 1 wherein said processor means employs cyclic redundancy check (CRC) codes.

9. An adapter according to claim 1 wherein said formatted signal generated by said protocol controller means are CRC encoded.

10. An adapter according to claim 1 wherein said formatted signals generated by said protocol controller means are CRC encoded.

11. An adapter according to claim 1 wherein said signals generated by said converter means are encoded for dc-balanced operation.

12. An adapter according to claim 1 wherein said received by said converter means are encoded for error-detection.

13. An adapter according to claim 1 wherein said asynchronous control signals received by said backplane adapter means includes channel control information generated by said DTE, said backplane adapter means comprising:
   interface means for transferring said asynchronous control and data signals in to and out from said first port;
   first data protection means receiving said backplane adapter means includes first data protection means receiving said asynchronous control and data signals for ascertaining the parity of said data signals, for generating a signal indicative of a parity error and for generating a parity signal to said data signals;
   channel input/output register means for receiving and for storing said channel control information;
   means receiving said asynchronous signals for generating therefrom said asynchronous data signals at a plurality of output terminals and for receiving said synchronous data signals at a plurality of input terminals for condition to said first data protection means;
   first-in, first-out (FIFO) register means having an input connected to said plurality of synchronize input terminals, having an output connected to said plurality of synchronizer output terminals for receiving at said input, for temporarily storing, and for generating at said output said synchronous data signals; stack register means having an input connected to said plurality of synchronizer input terminals, having an output connected to said plurality of synchronizer output terminals for receiving at said input, for temporarily storing, and for generating at said output said synchronous data;

second data protection means receiving said backplane adapter means includes second data protection means receiving said synchronous control and data signals for ascertaining the parity of said data signals, for generating a signal indicative of a parity error and for generating a parity signal to be appended to said data signals;

means responsive to said first plurality of processor control signals, connected to said synchronizer output terminals for providing said DMA to said processor means memory; and wherein said second port receives said synchronous signals generated at said synchronizer output terminals and generated said synchronous signals received at said synchronizer input terminals.

14. An adapter according to claim 2 wherein said arbiter means comprises:

bus transceivers means responsive to a first and a second arbiter control signal, for selective interconnection of said first and said second bi-directional bus;

pulse stretcher means responsive to said first arbiter control signal and a third arbiter control signal for generating said first arbiter control signal; and state machine means responsive to predetermined ones of said first and said second plurality of processor control signals and to said control signals generated by said backplane adapter means for generating said first and said second arbiter control signals and said signals received by said processor means.

15. An adapter according to claim 14 wherein said pulse stretcher means selectively lengthens said second arbiter control signal when interconnecting said first and said second busses to conduct data in the direction from said second bus to said first bus.

16. An adapter according to claim 14 wherein said state machine generates said first and said third arbiter control signals to disconnect said first and second busses.

17. An adapter according to claim 1 wherein said protocol controller means provides said format according to a layer 2 of said predetermined protocol formatting; and said processor means provides said format according to a layer 3 of said predetermined protocol formatting.

* * * * *